United States Patent
Yoshimi et al.

Patent Number: 5,387,473
Date of Patent: Feb. 7, 1995

[54] WELDABLE BLACK STEEL SHEET WITH LOW-GLOSS APPEARANCE

[75] Inventors: Naoto Yoshimi; Masaaki Yamashita; Toyofumi Watanabe, all of Tokyo, Japan

[73] Assignee: NKK Corporation, Tokyo, Japan

[21] Appl. No.: 36,991

[22] Filed: Mar. 24, 1993

[30] Foreign Application Priority Data

Mar. 31, 1992 [JP] Japan ................... 4-105528
Sep. 8, 1992 [JP] Japan ................... 4-265330

[51] Int. Cl.$^6$ ............................................. B32B 15/08
[52] U.S. Cl. ...................................... 428/623; 428/626
[58] Field of Search ............... 428/623, 626, 632, 659

[56] References Cited

U.S. PATENT DOCUMENTS

| | | | |
|---|---|---|---|
| 4,948,678 | 8/1990 | Shindou et al. | 428/623 |
| 4,981,759 | 1/1991 | Nakatani et al. | 428/626 |
| 5,110,689 | 5/1992 | Watanabe et al. | 428/623 |
| 5,141,822 | 8/1992 | Matsuo et al. | 428/623 |

FOREIGN PATENT DOCUMENTS

| | | |
|---|---|---|
| 30593 | 8/1980 | Japan . |
| 62996 | 8/1981 | Japan . |
| 193376 | 11/1983 | Japan . |
| 38276 | 8/1986 | Japan . |
| 89879 | 4/1987 | Japan . |
| 30262 | 7/1987 | Japan . |
| 263995 | 11/1987 | Japan . |

OTHER PUBLICATIONS

Hawley, Gessner. The Condensed Chemical Dictionary 10th ed (1981) pp. 919–920.

*Primary Examiner*—John Zimmerman
*Attorney, Agent, or Firm*—Nields & Lemack

[57] ABSTRACT

A steel sheet plated with zinc or a zinc alloy carries a chromate film formed on each side thereof and having a coating weight of 1 to 200 mg/m$^2$ in terms of metallic chromium, and a black film formed at least on the chromate film on one side thereof. The black film contains 100 parts by weight of a thermosetting resin which is soluble in an organic solvent, 1 to 200 parts by weight of a black dye which is also soluble in an organic solvent, and 1 to 100 parts by weight of organic resin particles. It may further contain 1 to 100 parts by weight of fine inorganic particles, or a solid lubricant, or both. The black film has a thickness of 0.3 to 5.0 microns which is sufficiently small to permit the welding of the sheet, and yet has an excellently black surface. The organic resin particles, etc., which are used as a matting agent, give the film a surface of low gloss which resists visible staining by fingerprints.

32 Claims, 1 Drawing Sheet

WELDABLE BLACK STEEL SHEET WITH LOW-GLOSS APPEARANCE

FIELD OF THE INVENTION

This invention relates to a low-gloss black steel sheet which is weldable and exhibits an excellent appearance having a black color, and which is, therefore, suitable for electrical appliances such as video tape recorders and copying machines, articles for interior decoration, automobile parts, building materials, etc.

BACKGROUND OF THE INVENTION

There has recently been growing a demand for a weldable black steel sheet having an excellent appearance as a material used for electrical appliances such as video tape recorders and copying machines, etc. A wide variety of attempts have, therefore, been made to develop methods for the blackening treatment of a steel sheet. Moreover, there has been growing a demand for a low-gloss black steel sheet which can satisfy the consumers' desire for an article for appearance of low gloss and apparently of high quality, and also the requirement that no clearly visible fingerprint be left on the surface of a black steel sheet by anybody touching it during its shaping, or its use in the fabrication of a particular article.

The following in an summary of the methods which have usually been employed for forming a black film on a steel sheet:

(a) A black paint containing a black pigment, such as carbon black, is applied onto a steel sheet by e.g. spraying or roll coating to form thereon a film having a thickness of several tens of microns.

(b) Metal coatings plated on steel sheets are reacted or electrolized in various solutions to form black films. This method includes a number of modes as will hereunder be set forth:

(1) A chromating solution containing Ag ions is used to form a black chromate film (as proposed in Japanese Patent Application Laid-Open No. 193376/1983);

(2) A black resin film composed mainly of carbon black is electro deposited (Japanese Patent Application Laid-Open No. 62996/1981);

(3) A steel sheet which has been electroplated with a Zn-Co, Zn-Ni or Zn-Mo alloy is subjected to anodizing (Japanese Patent Publication No. 38276/1986);

(4) A steel sheet which has been plated with a Zn-Ni alloy is subjected to immersing, spraying or anodizing with a solution containing nitric acid or a nitrate group to develop a black surface (Japanese Patent Publication No. 30262/1987);

(5) A black plated film formed by cathodic treatment (e.g. Japanese Patent Application Laid-Open No. 263995/1987); and (6) Displacement plating is carried out on a surface plated with zinc or an alloy thereof to deposit thereon a metal having a nobler potential (e.g. Japanese Patent Application Laid-Open No. 89879/1987).

(c) A treating solution obtained by adding an organic dye to an aqueous solution of potassium sodium silicate is applied onto a surface plated with zinc or an alloy (Japanese Patent Publication No. 30593/1980).

All of these methods do, however, have their own drawbacks, as will hereunder be pointed out.

(a) This is a common method of coating used to form an outer surface coating, the thickness of which is usually at least 10 microns when it consists of a single layer. This thickness is too large to allow the welding of the steel sheet. It is however, difficult to obtain a excellent black appearance of black film having a thin thickness allowing the welding of the sheet, even if the solution may contain the black pigment, such as carbon black, at the maximum possible concentration. In other words, the use of any such blackening agent has been found unable to form any thin black coated steel sheet that has both good black appearance and weldability.

(b) (1) The solution containing Ag ions is expensive. Moreover, this method spends as long a time as several tens of seconds in forming a black film and is, therefore, inapplicable to the continuous treatment of a strip of steel sheet which need be finished as rapidly as within five seconds.

(2) The black film which is formed by this method is unsatisfactory in formability. Insofar as carbon black is a conductive pigment, the film is electrically conductive and is, therefore, low in corrosion resistance. Moreover, the film is unsatisfactory in blackness.

(3) and (4) These methods are both uneconomical, since they rely upon the dissolution of metal from the plated layer on the steel sheet. Moreover, the metal ions as dissolved from the plated layer deteriorate the solution for the blackening treatment and can present a serious problem to the continuous treatment. Furthermore, both of the methods have only a limited scope of application, i.e. (3) is applicable only to a steel sheet plated with a Zn-Co, Zn-Ni or Zn-Mo alloy, while (4) is applicable only to a sheet plated with a Zn-Ni alloy.

(5) The black film which is formed by this method is unsatisfactory in formability.

(6) The black film which is formed by this method is unsatisfactory in adhesive strength, and is also low in corrosion resistance, insofar as a metal having a noble or high potential is deposited on a metal having a base or low potential (i.e. on zinc or an alloy thereof).

(c) This method is not intended for forming a film having an excellently black surface, nor is it intended for imparting weldability, insofar as the disclosure does not contain any specific reference to the film thickness. Moreover, as the film is basically composed of potassium sodium silicate, the hardened film is unsatisfactory in lubricating property as required during press forming, and is, therefore, unsuitable for any steel sheet that is used for making domestic electrical appliances, office machines or furniture, etc.

Moreover, none of the above methods is intended for forming a low-gloss, or matted black film, but the film formed by any of those methods has a distinctly lustrous surface.

SUMMARY OF THE INVENTION

Under these circumstances, it is an object of this invention to provide a black steel sheet which is weldable, as opposed to any known black film formed by employing a black pigment, such as carbon black (as the product of the method described at (a) above), and yet has an excellently black appearance, and which has, moreover, a low-gloss, or matted surface of apparently high quality on which no matted surface of apparently high quality on which no easily visible fingerprint is likely to be left by anybody touching it.

It is another object of this invention to provide a black steel sheet which not only has an excellently black appearance of low gloss, but is also excellent in corrosion resistance, adhesive strength and formability.

A black steel sheet obtained by forming black films on both sides of a steel sheet plated with zinc or a zinc alloy has the disadvantages that it is low in weldability, as the films have no electrical conductivity, and that it is expensive. A particularly high level of weldability is required of a black steel sheet when its spot welding is done by a welding machine having a small force for applying pressure and a low maximum welding current, or when it is used for making parts for use in a process for the continuous assembly of a large number of parts which calls for the formation of thousands of continuously formed welded spots.

It is, therefore, a third object of this invention to provide a black steel sheet which is excellent in weldability, while having an excellently black appearance of low gloss, and can be manufactured at a low cost.

The first and second objects of this invention as hereinabove stated are attained by:

(1) A weldable low-gloss black steel sheet which comprises a steel sheet plated with zinc or a zinc alloy, and carrying a chromate film formed on its surface and having a coating weight of 1 to 200 mg/m$^2$ in terms of metallic chromium, and a black film formed on the chromate film from a composition comprising 100 parts by weight of a thermosetting resin as a base resin, 1 to 200 parts by weight of a black dye as a blackening agent and 1 to 150 parts by weight of organic resin particles, the thermosetting resin and the dye being soluble in an organic solvent.

(2) A weldable low-gloss black steel sheet which comprises a steel sheet plated with zinc or a zinc alloy, and carrying a chromate film formed on its surface and having a coating weight of 1 to 200 mg/m$^2$ in terms of metallic chromium, and a black film formed on the chromate film from a composition comprising 100 parts by weight of a thermosetting resin as a base resin, 1 to 200 parts by weight of a black dye as a blackening agent, 1 to 150 parts by weight of organic resin particles and 1 to 100 parts by weight of fine inorganic particles, the thermosetting resin and the dye being soluble in an organic solvent.

(3) A weldable low-gloss black steel sheet which comprises a steel sheet plated with zinc or a zinc alloy, and carrying a chromate film formed on its surface and having a coating weight of 1 to 200 mg/m$^2$ in terms of metallic chromium, and a black film formed on the chromate film from a composition comprising 100 parts by weight of a thermosetting resin as a base resin, 1 to 200 parts by weight of a black dye as a blackening agent, 1 to 150 parts by weight of organic resin particles and 1 to 100 parts by weight of a solid lubricant, the thermosetting resin and the dye being soluble in an organic solvent.

(4) A weldable low-gloss black steel sheet which comprises a steel sheet plated with zinc or a zinc alloy, and carrying a chromate film formed on its surface and having a coating weight of 1 to 200 mg/m$^2$ in terms of metallic chromium, and a black film formed on the chromate film from a composition comprising 100 parts by weight of a thermosetting resin as a base resin, 1 to 200 parts by weight of a black dye as a blackening agent, 1 to 150 parts by weight of organic resin particles, 1 to 100 parts by weight of fine-inorganic particles and 1 to 100 parts by weight of a solid lubricant, the thermosetting resin and the dye being soluble in an organic solvent.

(5) A weldable low-gloss black steel sheet as set forth at (2) or (4) above, wherein the fine inorganic particles are of one or more materials selected from among silica, an extender pigment, a sparingly soluble chromic acid salt which has low solubility in water and carbon black.

(6) A weldable low-gloss black steel sheet as set forth at (3) or (4) above, wherein the black film contains as the solid lubricant one or more substances selected from among polyolefin wax, paraffin wax, fluororesins, fatty acid amides, metallic soaps, molybdenum disulfide, graphite, graphite fluoride, boron nitride and polyalkylene glycols.

Still higher levels of matting and resistance to staining by fingerprints are attained by:

(7) A weldable low-gross black steel sheet which comprises a steel sheet plated with zinc or a zinc alloy, and carrying a chromate film formed on its surface and having a coating weight of 1 to 200 mg/m$^2$ in terms of metallic chromium, and a black film formed on the chromate film from a composition comprising 100 parts by weight of a thermosetting resin as a base resin, 1 to 200 parts by weight of a black dye as a blackening agent and 10 to 150 parts by weight of organic resin particles having an average diameter of 1 to 25 microns, the thermosetting resin and the dye being soluble in an organic solvent, the black film having a thickness of 0.3 to 5.0 microns.

(8) A weldable low-gross black steel sheet which comprises a steel sheet plated with zinc or a zinc alloy, and carrying a chromate film formed on its surface and having a coating weight of 1 to 200 mg/m$^2$ in terms of metallic chromium, and a black film formed on he chromate film from a composition comprising 100 parts by weight of a thermosetting resin as a base resin, 1 to 200 parts by weight of a black dye as a blackening agent, 10 to 150 parts by weight of organic resin particles having an average diameter of 1 to 25 microns, and 1 to 30 parts by weight of silica such as a precipitated type or a gel type, obtained by the reaction of sodium silicate and mineral acids, the thermosetting resin and the dye being soluble in an organic solvent, the black film having a thickness of 0.3 to 5.0 microns.

(9) A weldable low-gloss black steel sheet which comprises a steel sheet plated with zinc or a zinc alloy, and carrying a chromate film formed on its surface and having a coating weight of 1 to 200 mg/m$^2$ in terms of metallic chromium, and a black film formed on the chromate film from a composition comprising 100 parts by weight of a thermosetting resin as a base resin, 1 to 200 parts by weight of a black dye as a blackening agent, 10 to 150 parts by weight of organic resin particles having an average diameter of 1 to 25 microns and 1 to 40 parts by weight of particles of a fluorine compound, the thermosetting resin and the dye being soluble in an organic solvent, the black film having a thickness of 0.3 to 5.0 microns.

(10) A weldable low-gloss black steel sheet which comprises a steel sheet plated with zinc or a zinc alloy, and carrying a chromate film formed on its surface and having a coating weight of 1 to 200 mg/m$^2$ in terms of metallic chromium, and a black film formed on the chromate film from a composition comprising 100 parts by weight of a thermosetting resin as a base resin, 1 to 200 parts by weight of a black dye as a blackening agent, 10 to 150 parts by weight of organic resin particles having an average diameter of 1 to 25 microns, 1 to 30 parts by weight of particles by weight of silica such as a precipitated type or a gel type, obtained by the reaction of sodium silicate and mineral acids, and 1 to 40 parts by weight of particles of a fluorine compound, the thermosetting resin and the dye being soluble in an organic solvent, the black film having a thickness of 0.3 to 5.0 microns.

(11) A weldable low-gloss black steel sheet as set forth at any of ( 7 ) to ( 10 ) above, wherein the black film further contains a total of 1 to 40 parts by weight of at least one of a sparingly soluble chromic acid salt and fumed silica produced by pyrogenic processes.

(12) A weldable low-gloss black steel sheet as set forth at any of ( 7 ) to ( 10 ) above, wherein the black film further contains a total of 1 to 40 parts by weight of at least one of polyethylene wax and paraffin wax.

(13) A weldable low-gloss black steel sheet as set forth at any of (7) to (10) above, wherein the black film further contains ( A ) and ( B ):
  (A) a total of 1 to 40 parts by weight of at least one of a sparingly soluble chromic acid salt and fumed silica; and
  (B) a total of 1 to 40 parts by weight of at least one of polyethylene wax and paraffin wax.

The following is a summary of the limitations which can be employed for defining more specifically the black steel sheet as set forth at any of (1) to (13) above:

(14) A weldable low-gloss black steel sheet as set forth at any of (1) to (13) above, wherein the organic resin particles are of one or more resins selected from among urethane, silicone, epoxy, amino, acrylic, acrylonitrile, acryl-urethane, polyamide, polyester and polypropylene resins.

(15) A weldable low-gloss black steel sheet as set forth at any of (1) to (13) above, wherein the organic resin particles are black particles of one or more resins selected from among urethane, silicone, epoxy, amino, acrylic, acrylonitrile, acryl-urethane, polyamide, polyester and polypropylene resins.

(16) A weldable low-luster black steel sheet as set forth at any of (1) to (13) above, wherein the black film contains as the black dye one or more dyes selected from among azo and azine dyes.

(17) A weldable low-luster black steel sheet as set forth at any of (1) to (13) above, wherein the black dye is an metal complex of azo dye.

(18) A weldable low-luster black steel sheet as set forth at any of (1) to (13) above, wherein the black dye is a mixture of an metal complex of azo dye and a phthalocyanine dye.

The third object of this invention is essentially attained by a steel sheet having both chromate and black films on one side thereof, and only a chromate film on the other side. The chromate film on the other side of the sheet may be so composed as to form a surface having the property of anti-fingerprints, as during the assembly of electrical appliances, and a high level of corrosion resistance which will last for a long period of time.

More specifically, the third object of this invention is attained by:

(19) A weldable low-gloss black steel sheet as set forth at any of (1) to (18) above, wherein the sheet carries the back film only on one side thereof, while on the other side thereof, it carries a chromate film having a coating weight of 10 to 120 mg/m$^2$ in terms of metallic chromium.

(20) A weldable low-gloss black steel sheet as set forth at (19) above, wherein the chromate film on the other side of the sheet is a film formed by applying a chromating solution containing hexavalent and trivalent chromium ions in a weight ratio of 40/60 to 80/20 (hexavalent/trivalent) in terms of metallic chromium, whereafter it is heated and dried.

(21) A weldable low-gloss black steel sheet as set forth at (19) above, wherein the chromate film on the other side of the sheet is a film formed by applying a chromating solution containing hexavalent and trivalent chromium ions and a colloidal silica, the hexavalent and trivalent chromium ions having a weight ratio of 40/60 to 80/20 (hexavalent/trivalent) in terms of metallic chromium, and the colloidal silica and the total of the chromium ions in terms of metallic chromium having a weight ratio of $\frac{1}{2}$ to 8/1 (colloidal silica/chromium ions), whereafter it is heated and dried.

(22) A weldable low-gloss black steel sheet as set forth at (19) above, wherein the chromate film on the other side of the sheet is a film formed by applying a chromating solution containing hexavalent and trivalent chromium ions and an aqueous resin, the hexavalent and trivalent chromium ions having a weight ratio of 40/60 to 80/20 (hexavalent/trivalent) in terms of metallic chromium, and the aqueous resin and the total of the chromium ions in terms of metallic chromium having a weight ratio of 1/20 to 40/1 (aqueous resin/chromium ions), whereafter it is heated and dried.

(23) A weldable low-gloss black steel sheet as set forth at (19) above, wherein the chromate film on the other side of the sheet is a film formed by applying a chromating solution containing hexavalent and trivalent chromium ions, a colloidal silica and an aqueous resin, the hexavalent and trivalent chromium ions having a weight ratio of 40/60 to 80/20 (hexavalent/trivalent) in terms of metallic chromium, and the colloidal silica and the total of the chromium ions in terms of metallic chromium having a weight ratio of $\frac{1}{2}$ to 8/1 (collidal silica/chromium ions), and the aqueous resin and the total of chromium ions in terms of metallic chromium having a weight ratio of 1/20 to 40/1 (aqueous resin/chromium ions), whereafter it is heated and dried.

(24) A weldable low-gloss black steel sheet as set forth at (19) above, wherein the chromate film on the other side of the sheet is a film formed by applying a chromating solution containing hexavalent and trivalent chromium ions trivalent PO$_4$ ions and divalent zinc ions, the hexavalent and trivalent chromium ions having a weight ratio of 40/60 to 80/20 (hexavalent/trivalent) in terms of metallic chromium, the trivalent PO$_4$ ions and the total of the chromium ions in terms of metallic chromium having a weight ratio of 1/30 to 2/1 (PO$_4$ ions/chromium ions), and the divalent zinc and the hexavalent chromium ions in terms of metallic chromium having a weight ratio of 1/40 to $\frac{2}{3}$ (zinc ions/chromium ions), whereafter it is heated and dried.

(25) A weldable low-gloss black steel sheet as set forth at (19) above, wherein the chromate film on the other side of the sheet is a film formed by applying a chromating solution containing hexavalent and trivalent chromium ions, a colloidal silica, trivalent PO$_4$ ions and divalent zinc ions, the hexavalent and trivalent chromium ions having a weight ratio of 40/60 to 80/20 (hexavalent/trivalent) in terms of metallic chromium, the (colloidal silica and the total of the chromium ions in terms of metallic chromium having a weight ratio of $\frac{1}{2}$ to 8/1 (colloidal silica/chromium ions), the trivalent PO$_4$ ions and the total of the chromium ions in terms of metallic chromium having a weight ratio of 1/30 to 2/1 (PO$_4$ ions/chromium ions), and the divalent zinc ions and the hexavalent chromium ions in terms of metallic chromium having a weight ratio of 1/40 to $\frac{2}{3}$ (zinc ions/chromium ions), whereafter it is heated and dried.

(26) A weldable low-gloss black steel sheet as set forth at (19) above, wherein the chromate film on the other side of the sheet is a film formed by applying a chromating solution containing hexavalent and trivalent chromium ions, an aqueous resin, trivalent PO$_4$ ions and divalent zinc ions, the hexavalent and trivalent chromium ions having a weight ratio of 40/60 to 80/20 (hexavalent/trivalent) in terms of metallic chromium, the aqueous resin and the total of the chromium ions in terms of metallic chromium having a weight ratio of 1/20 to 40/1 (aqueous resin/chromium ions), the trivalent PO$_4$ ions and the total of the chromium ions in terms of metallic chromium having a weight ratio of 1/30 to 2/1 (PO$_4$ ions/chromium ions), and the divalent zinc ions and the hexavalent chromium ions in terms of metallic chromium having a weight ratio of 1/40 to $\frac{2}{3}$ (zinc ions/chromium ions), whereafter it is heated and dried.

(27) A weldable low-gloss black steel sheet as set forth at (19) above, wherein the chromate film on the other side of the sheet is a film formed by applying a chromating solution containing hexavalent and trivalent chromium ions, a colloidal silica, an aqueous resin, trivalent PO$_4$ ions and divalent zinc ions, the hexavalent and trivalent chromium ions having a weight ratio of 40/60 to 80/20 (hexavalent/trivalent) in terms of metallic chromium, the colloidal silica and the total of the chromium ions in terms of metallic chromium having a weight ratio of 1/20 to 8/1 (colloidal silica/chromium ions), the aqueous resin and the total of the chromium ions in terms of metallic chromium having a weight ratio of 1/20 to 40/1 aqueous resin/chromium ions), the trivalent PO$_4$ ions and the total of the chromium ions in terms of metallic chromium having a weight ratio of 1/30 to 2/1 (PO$_4$ ions/chromium ions), and the divalent zinc ions and the hexavalent chromium ions in terms of metallic chromium having a weight ratio of 1/40 to $\frac{2}{3}$ (zinc ions/chromium ions), whereafter it is heated and dried.

DETAILED DESCRIPTION OF THE INVENTION

Figure 1:
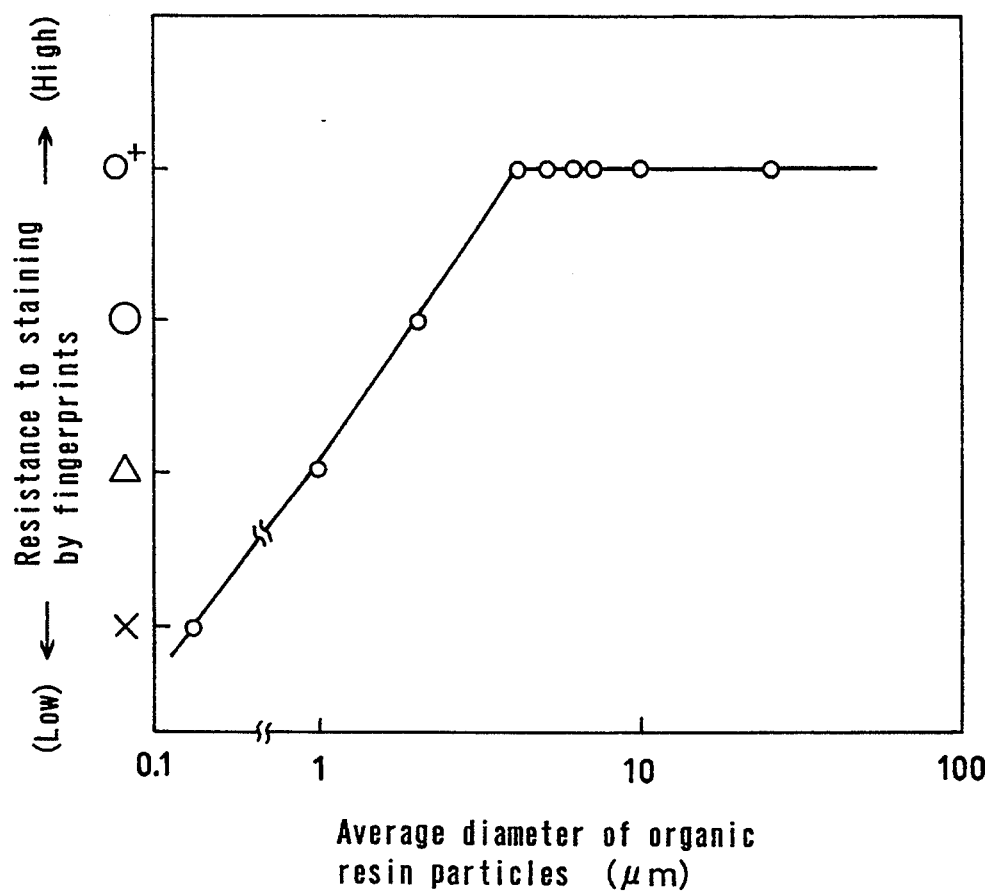
FIG. 1 is a graph showing the resistance to staining by fingerprints (i.e. the property of anti-fingerprint) of black films in relation to the diameter of organic resin particles which they contain.

The black steel sheet of this invention essentially comprises a steel sheet plated with zinc or a zinc alloy, which is a starting material therefor, a chromate film formed on its plated surface, and a black film formed on the chromate film from a composition comprising a thermosetting resin which is soluble in an organic solvent, a black dye which is also soluble in an organic solvent, and a mating agent.

The black dye which can be used for the purpose of this invention may be a single black dye which consists of molecules having the same chemical structure, or a mixture of different dyes which consist of molecules having different chemical structures and give a black color only when mixed.

The steel sheet used as the starting material may, for example, be a steel sheet plated with zinc, an alloy of zinc and iron, an alloy of zinc and nickel, an alloy of zinc and manganese, an alloy of zinc and aluminum,, an alloy of zinc, cobalt and chromium, or a similar plating composition further containing one or more elements such as Ni, Fe, Mn, Mo, Co, Al and Cr. It is also possible to use as the starting material a steel coated with a disperse plated layer formed from a composition similar to any of those mentioned above, but further containing, for example, a granular resin, silica, or a chromium compound. Moreover, the starting material may be a compositely plated steel sheet carrying a coating formed by two or more layers of the same or different compositions, for example, two or more layers of Zn-Fe alloys having different iron contents.

As far as its blackness is concerned, a similar black film can be produced on any steel sheet, and a hot or cold rolled steel sheet which has not been plated can, for examples, be used as the starting material. It is also possible to use a sheet of stainless steel, or an aluminum or titanium alloy. From the standpoints of economy and corrosion resistance, however, it is desirable to manufacture the black steel sheet of this invention from a steel sheet plated with zinc, or a zinc alloy including any similar composition as hereinabove mentioned, insofar as it may be used for making a part of, for example, a electrical appliances without being given any paint finish.

The starting material may be a product of any appropriate plating process, such as an electrolytic, dip coating, or vapor phase process.

A chromate film is formed on the surface of the starting material by chromate treatment. The combination of the chromate film and a black film formed thereon and containing a specific blackening agent as well hereinafter be described gives a very high level of corrosion resistance to the black steel sheet of this invention.

The chromate film is so formed as to have a dry coating weight of 1 to 200 mg/m$^2$, preferably 30 to 80 mg/2, in terms of metallic chromium. If its coating weight exceeds 200 mg/m$^2$, it is likely to lower the formability and weldability of the steel sheet. If its coating weight is smaller than 1 mg/m$^2$, the film is likely to lack uniformity and lower the corrosion resistance of the steel sheet. The chromate film preferably contains hexavalent chromium, or chromium having a valence of 6, since hexavalent chromium ions exhibit a self-healing action which enables the steel sheet to resist any corrosion that may grow from any surface defect.

The chromate treatment for forming the chromate film can be carried out by any known process relying upon reaction, coating or electrolysis.

If a coating type of process is employed for the chromate treatment, it is carried out by employing a coating solution which consists mainly of a partially reduced chromic acid solution and may further contain a water-dispersible or -soluble organic resin, such as an acrylic resin, and/or silica (colloidal or fumed) having a particle diameter of several to several hundred millimicrons. The solution may contain chromium ions having a valence of 3 and ones having a valence of 6 in a ratio of 1:1 to 1:3, and have a pH of 1.5 to 4.0, preferably 2 to 3. The ratio of the chromium ions having a valence of 3 to those having a valence of 6 is adjusted by employing a commonly used organic reducing agent selected from among, for example, saccharides and alcohols, or a commonly used inorganic reducing agent. The coating type of chromate treatment may be carried out by any commonly used method, such as roll coating, dipping, or spraying. The treatment is not followed by water rinsing, but is directly followed by drying to give a chromate film, since rinsing results in the removal of chromium ions having a valence of 6. The film contains chromium ions having valences of 3 and 6 in the ratio in which the solution contains them. A resin film, which will be formed on the chromate film, prevents any excessive flow of chromium ions having a valence of 6 out of the chromate film in a corrosive environment and enables the maintenance of effective passivation and thereby high corrosion resistance for a long period of time.

An electrolytic type of chromate treatment is carried out by cathodic treatment in a bath comprising chromic anhydride and one or more kinds of anions selected from among, for example, sulfuric acid, phosphoric fluoride and halogenoxy acids, and is followed by rinsing in water and drying to give a chromate film.

The chromate film which is formed by the coating type of process contains a larger amount of chromium having a valence of 6 than that formed by the electrolytic process, and is, therefore, superior in corrosion resistance. The corrosion resistance of the former film becomes still better upon heat treatment, which improves its density and strength, as will hereinafter be described in further detail. The chromate film which is formed by the electrolytic process has the advantages of being high in density and strength even without being given heat treatment, and of being easy to control in coating weight. The film formed by the coating type of process is however, preferred from the standpoint of corrosion resistance.

Description will now be made of the black film formed on the chromate film and its components. The black film is essentially characterized by comprising a thermosetting resin which is soluble in an organic solvent (a base resin), a black dye which is also soluble in an organic solvent (a blackening agent), and organic resin particles or beads as a matting agent. The film may further contain a solid lubricant which is added to improve its matte finish and formability, or fine inorganic particles added to improve its matte finish and in some cases, its corrosion resistance, too.

The use of silica such as a precipitated type or a gel type, obtained by the reaction of sodium silicate and mineral acids, or particles of a fluorine compound, or both as the matting agent with organic resin particles having an average diameter of 1 to 25 microns is particularly desirable to achieve a particularly good matte finish and thereby a particularly good resistance to staining by fingerprints. The black film may further contain at least one of polyethylene and paraffin waxes to attain an improved formability, or lubricating property, and at least one of a sparingly soluble chromic acid salt and fumed silica to attain an improved corrosion resistance.

In the following description, the blackness of a black film will be judged by its lightness, or L value. The smaller the L value of a film, the better its blackness is. According to this invention, the black film is intended to have an L value not exceeding 30, preferably not exceeding 25 and more preferably not exceeding 20. The L values which are herein stated were measured by a multiple light source spectrophotometer manufactured by Suga Shikenki Kabushiki Kaisha (Model MSC).

It is essential that the blackening agent which is employed to form the black film be capable of giving a satisfactorily high degree of blackness when the film has a thickness allowing the welding of the underlying steel sheet, i.e. not exceeding five microns. Moreover, it is imperative for the blackening agent not to exert any adverse effect on any other property required of the black film, such as formability or corrosion resistance, when it is mixed with the base resin in a ratio ensuring that the film exhibit a satisfactorily high degree of blackness.

The coloring agents which are generally in use can be classified into three major types, i.e. inorganic pigments, organic pigments, and dyes. When as inorganic or organic pigment is used in a coating film having a small thickness not exceeding several microns, its hiding power has a critical bearing on the blackness of the film. Carbon black is a typical inorganic pigment used as a blackening agent. As it is, for example, inexpensive, carbon black is used more often than any other blackening agent, and is commercially available in a wide variety of grades for a wide range of application. Carbon black, however, fails to exhibit a sufficiently high hiding power for achieving a satisfactorily high degree of blackness in any film having a thickness not exceeding five microns, as intended by this invention, though its hiding power may be sufficient for an ordinary coating film having a thickness in the order of as large as several tens of microns. Moreover, carbon black is an electrically conductive pigment, and forms, therefore, an electrically conductive black film which lowers the corrosion resistance of the steel sheet on which the film has been formed. No other black inorganic pigment, such as iron oxide or titanium black, can form a satisfactorily black film.

Aniline Black is a typical black organic pigment, but has too low a hiding power to form a satisfactorily black film. Another black organic pigment known as Perylene Black is also incapable of forming a satisfactorily black film.

No combination of two or more organic or inorganic pigments has been found capable of achieving a satisfactorily high level of blackness.

The black dye can, however, form a film having a small thickness and yet a high level of blackness. The inorganic or organic pigment consists of particles, and the absorption of visible light by a mass of its particles apparently allows any black inorganic or organic pigment to present a black color. It is, therefore, apparent that such a mass of particles is required to form a film having a relatively large thickness to achieve a good level of blackness. On the other hand, the black dye, which is soluble in water or an organic solvent, can form a film in which it is dispersed densely in the form of very fine particles whichmay be as small as its molecules, and which can, therefore, exhibit a high level of blackness, even if the film may have a small thickness.

It is understood that there are commercially available thousands of dyes as counted by tradenames. They are classified by two major methods, i.e. (1) one is used for classifying the dyes by the chemical structure thereof, and (2) the other is used for the practical classification of the dyes based on their properties (see e.g. "*Handbook of Organic chemistry*", compiled by the Society of Organic Synthetic Chemistry, and published by Gihodo).

The method as stated at (1) above classifies the dyes by the chemical group in the molecule which gives rise to color. The dyes as classified by this method include nitroso, nitro, azo (monoazo, disazo, trisazo and tetrakisazo), anthraquinone, indigo, azine, cyanine, phthalocyanine, stilbene, sulfur, triazole, triphenylmenthane, acridine, diphenylmethane, and oxazine dyes.

According to the method as stated at (2) above, the dyes are classified into e.g. direct, acid, basic, acid mordant, metal complex, sulfur, vat, azoic, disperse, reactive, oxidation, fluorescent brightener, and oil-soluble (organic solvent-soluble) dyes.

It follows form these two ways of classification that, for example, the acid dyes according to the classification by the method-(2) include azo (monoazo, disazo, trisazo and tetrakisazo), anthraquinone, triphenylmethane, and azine dyes according to the classification by the method (1).

The color of a dye as the most important property thereof is due to the action of a chemical group containing an unsaturated bond, such as —CH═CH—, or 13 N═N—(chromophore), and a group containing a lone pair of electrons, such as —NH$_2$ or —OH (auxochrome), whereby, while light having a particular wavelength is absorbed, light having a different wavelength not causing absorption is visible to the eye as the color of the dye. Thus, there are various dyes having a variety of colors. These colors are yellow, orange, red, violet, blue, green, brown and black according to the classification by the Color Index.

The Color Index (Third Edition, Vols. 1 to 8) published by The Society of Dyers and Colourists and American Association of Textile Chemists and Colourists describes the commercially available dyes by class, structure, properties, use, etc., and classifies the dyes under "C.I. Generic Name".

The Color Index classifies the commercially available dyes in a practically useful way similar to that of classification by the method as stated at (2) above, and gives the classification of the colors which includes the classification of the dyes by the chemical structure in a numerical order starting with 1. If the chemical structural formula of a dye is specifically known, it is shown under "C.I. Constitution Number", and the majority of the dyes of which the chemical structural formulas are not clear are classified by chemical structure as, for example, azo (monoazo, disazo, etc.), anthraquinone, and azine dyes, as is the case with the classification by the method stated at (1) above.

For example, the black dyes belonging to the class of acid dyes are grouped under the classification "C.I. Acid Black" which includes "C.I. Acid Black 1" covering disazo dyes having a specific chemical structure, "C.I. Acid Black 2" covering azine dyes having a specific chemical structure, and "C.I. Acid Black 3" covering disazo dyes having another chemical structure, and classifies the dyes by color, properties, use, etc. The "C.I. Generic Name" provides a listing of dyes by the names under which the are commercially available.

We, the inventors of this invention, a mixture of a black dye which is soluble in an organic solvent, and a thermosetting resin which is also soluble in an organic solvent, can form a film having a sufficiently small thickness to allow welding, i.e. not exceeding five microns, and yet exhibiting an excellent level of blackness.

Such a black dye is easily soluble in an organic solvent, such as alcohol, Cellosolve, ester, or ketone, and can, therefore, form a composition for forming a black film if it is mixed with an organic solvent and a thermosetting resin which is soluble in the organic solvent. A black film formed from such a composition is excellently black, even if it may have a sufficiently small thickness to allow welding, i.e. a thickness not exceeding five microns. Insofar as the dye is highly fast to light, it can be used without presenting any problem for forming a black film which is likely to be exposed to light from various sources, such as one formed on a steel sheet which will be used to make electrical appliances, office machines or furniture, etc.

Although the black dye may be of any type as classified by the method (1), it is particularly preferably to use an azo or azine dye, or an metal complex azo dye, as will hereinafter be explained in detail. It is also possible to use a mixture containing another color dye, such as a phthalocyanine dye.

The black dye which is used for the purpose of this invention can be selected from among the dyes grouped as "Black" in the Color Index. It is, however, also possible to form a black film by mixing, for examples, yellow, red and violet dyes in accordance with the known subtractive process. Thus, the black dye which can be used for the purpose of this invention is not only a single black dye which consists of molecules having the same chemical structure, but also includes a mixture of different dyes which consist of molecules having different chemical structures and give a black color when mixed, as hereinbefore stated. Therefore, it is possible to use any black dye obtained by mixing dyes of the same or different classes in accordance with the subtractive process.

Incidentally, it is to be understood that this invention does not preclude the use of any black dye not appearing in the Color Index, such as a new dye not yet registered therein, or a mixture of dyes.

The black azo dyes are available at a low cost and can provide a good black appearance for a thin organic film.

We have also found that the use of a black metal complex of azo dye enables the formation of a black film which is superior in blackness, light fastness and corrosion resistance to any film formed by employing any other type of dye. This type of dye is characterized by:

(1) its superiority to any other dye in stability (or fastness) to light, apparently because it is a complex compound formed by two molecules of an azo dye and one atom of a metal (a complex metal salt of the 2:1 type), or by one molecule of an azo dye and one atom of a metal (a complex metal salt of the 1:1 type); and (2) its superiority to any other dye in blackness.

It is usually chromium that is used to form a complex salt with a dye, though other metals, such as Co, Cu, Fe and Al, can also be used for that purpose.

The black metal complex of azo dye which may be used for the purpose of this invention is a complex compound formed by a black azo dye selected from among the dye grouped as "C.I. Solvent Black" in the Color Index and a trivalent metal, such as chromium, copper or cobalt. According to "C.I. Generic Name" in the Color Index, typical examples are C.I. Solvent Black 6, 22, 23, 25, 28 to 30, 34 to 43, 46 and 47 to 49.

It is, of course, possible to use also any other black metal complex of azo dye that is not registered in the Color Index, such as a new product not yet registered therein, or a mixture of dyes which contains at least one black metal complex of azo dye, as hereinbefore stated.

The use of any black metal complex of azo dye as the blackening agent for the black film enables the formation of a black film having a uniformly and excellently black appearance and also having a sufficiently small thickness to allow welding, i.e. a thickness not exceeding five microns, and exhibiting a particularly high level of light fastness.

The use of a mixture of an metal complex of azo dye and a phthalocyanine dye enables the formation of a beautiful black film having a controlled color tone. For example, it is possible to form a film having a very beautiful surface by blending a yellow azo metal complex of azo dye and a blue phthalocyanine dye with a black metal complex of azo dye, as in the case of Sample 9 of this invention in EXAMPLE 4.

A black azine dye which is soluble in an organic solvent (hereinafter referred to as "solvent-soluble"), and a solvent-soluble black azo dye which is not a complex metal salt (hereinafter referred to simply as "dye, or non-complex dye") are inferior in light fastness to any black metal complex of azo dye, but are superior to any black mordant dye. Moreover, they have the advantage of being about 20 to 50% less expensive than any solvent-soluble black metal complex of azo dye, and thereby enabling the formation of a less expensive black film.

According to the Color Index, examples of the solvent-soluble black azo dyes are:

C.I. Solvent Black 1, 2, 6, 15, 24 and 35 (mono-azo dyes);
C.I. Solvent Black 3, 4 and 39 (disazo dyes); and
C.I. Solvent Black 26, 46 and 51 (dyes containing an unknown number of azo groups in the molecule).

It is, of course, possible to use any existing or new dye not appearing in the Color Index, too. It is also possible to use a mixture of two or more solvent-soluble black azo dyes, or a mixture of a black azo dye and a different dye having a different chemical structure.

Examples of the commercially available products are:
Neptun Black X60 (C.I. Solvent Black 3; product of BASF);
Neptun A Black X17 (C.I. Solvent Black 46; product of BASF); and
Mitsui Oil Black YG-6 (C.I. Solvent Black 39; product of Mitsui-Toatsu Dye Co., Ltd.).

All of these dyes form an excellently black film.

The solvent-soluble black azine dyes can be used to form a black film having a sufficiently small thickness not exceeding five microns, but exhibiting an excellently black surface which is comparable to that of a film formed by any solvent-soluble black metal complex of azo dye. Moreover, they have the advantage of being about 50% less expensive than any solvent-soluble black metal complex of azo dye, and thereby enabling the formation of a by far less expensive black film.

The dyes listed as C.I. Solvent Black 5, 5:1, 7, 31, 32 and 50 in the Color Index are examples of the solvent-soluble black azine dyes. It is, of course, possible to use any existing or new dye not appearing in the Color Index, too. It is also possible to use a mixture of two or more solvent-soluble black azine dyes, or a mixture or a black azine dye and a different dye having a different chemical structure.

Examples of the commercially available solvent-soluble black azine dyes are:

Basonyl Black X22 (C.I. Solvent Black; product of BASF);
Orient spirit Black SB (C.I. Solvent Black 5; product of Orient Chemical Industries, Ltd.);
Orient spirit Black SSBB (C.I. Solvent Black 5; product of Orient Chemical);
Orient Nigrosine Base EX (C.I. Solvent Black 7; product of Orient Chemical);
Orient Oil Black BS (C.I. Solvent Black 7; product of Orient Chemical);
Orient Special Black EB (C.I. Solvent Black 7; product of Orient Chemical); and
Sumisol Black AR (C.I. Solvent Black 50; product of Sumitomo Chemical Industrial Co., Ltd.).

All of these dyes form an excellently black film.

The black film which contains a solvent-soluble black dye has a high level of corrosion resistance, as hereinabove stated, and its corrosion resistance is by far higher than that of any conventional black film containing a pigment as its blackening agent. This is apparently due to the facts:

(i) That the black dye is not an electrical conductor;
(ii) That fine particles of the dye, which are as small as its molecules, are distributed in the black film uniformly and densely to render it passive; and
(iii) That those particles of the dye prevent penetration of ions through the film and thereby improve its barrier effect.

The corrosion resistance of the steel sheet carrying such a black film owes itself primarily to the barrier effect of the chromate film passivated by trivalent chromium ions and the barrier effect of the resin in the black film, and is further improved by the barrier effect of the dye as hereinabove stated. Other factors contributing to its high corrosion resistance include the self-healing action of the chromate film which enables it to maintain its passivity by virtue of the conversion of hexavalent chromium ions to trivalent ones, and the high adhesive strength which is obtained between the zinc or zinc alloy layer and the chromate film, and between the chromate film and the black film.

According to this invention, the black film is preferably formed by coating, so that it may be possible to avoid any problem arising from the deterioration of the solution employed for etching type of blackening treatment, or blackening treatment relying upon reaction, such as electrolytic or immersion plating, and so that it may be possible to utilize the greatest advantage of coating and form the black film on any steel sheet irrespective of the material employed for plating it.

The black film is so formed as to contain 1 to 200, preferably 4 to 120, parts by weight of solvent-soluble black dye with 100 parts by weight of base resin. If the proportion of the black dye is smaller than one part by weight, blackness of the film is insufficient. If it exceeds 200 parts by weight, a part of the dye remains undissolved and adversely affects the adhesion of the black film to the steel sheet.

The black film is so formed as to have a thickness of 0.3 to 5.0, preferably 0.7 to 3.0, microns. If it is smaller than 0.3 micron, blackness of the film is insufficient. If it exceeds 3.0 microns, the film lowers the spot weldability of the steel sheet, and if it exceeds 5.0 microns, the film greatly lowers the weldability.

The base resin used to form the black film on the steel sheet of this invention is a thermosetting resin which is soluble in an organic solvent. The resin need be soluble in an organic solvent, since the black dye which is soluble in an organic solvent is difficult to dissolve satisfactorily in the solution of a water-soluble resin. The resin need also be thermosetting, since the use of a thermoplastic resin is likely to result in a film which is low in scratch resistance.

Specific examples of the applicable thermosetting resins which are soluble in an organic solvent are acrylic copolymer, alkyd, epoxy, polybutadiene, phenolic, and polyurethane, resins, and fluororesins. It is also possible to use a mixture of two or more such resins, a product of addition condensation formed by any such resin and another monomer, or a derivative of any such resin obtained by modification with another resin. Acrylic copolymer, alkyd, and epoxy resins, or fluororesins are, among others, preferred.

The acrylic copolymer resins are synthesized from ordinary unsaturated ethylenic monomers by e.g. solution, emulsion or suspension polymerization. This type of resin is obtained by employing as an essential component a hard monomer such as methacrylate, acrylonitrile, styrene, acrylic acid, acrylamide or vinyltoluene, and adding an appropriate proportion of an unsaturated vinyl monomer to impart hardness, flexibility and crosslinking property to the resin. The resin may be modified by another kind of resin, such as an alkyd, epoxy, or phenolic resin.

As regards the alkyd resins, it is possible to use any of the known products which can be synthesized by ordinary methods, for example, oil-modified, rosin-modified, phenol-modified, styrenated, silicone-modified, and acryl-modified alkyd resins, and oil-free alkyd (polyester) resins.

Examples of the suitable epoxy resins are straight epoxy resins of e.g. the epichlorohydrin or glycidyl ether type, and fatty acid-modified, polybasic acid-modified, acrylic resin-modified, alkyd- (or polyester-)modified, polybutadiene-modified, phenol-modified, amine- or polyamine-modified, and urethane-modified epoxy resins.

A known curing agent is used with the resin. Examples of the appropriate curing agents are melamine, blocked isocyanate, and urea.

The black film of the composition as hereinabove described, however, has a lustrous or glossy surface. Its luster lowers its resistance to visible staining by fingerprints, since portions of the film having fingerprints left thereon scatter light to so different a degree from portions not having any fingerprint left thereon that the fingerprints are clearly or easily visible. It is to be understood that, whenever the term "staining by fingerprints" is hereinafter used, it means visible staining.

The resistance of the black film to staining by fingerprints can effectively be improved if its gloss is reduced to eliminate substantially completely the difference in the degree of light reflection or scattering between its portions having fingerprints left thereon and its remaining portions, so that the fingerprints may not clearly or easily visible. We have, therefore, studied the addition of a matting agent to the black film and its effect.

Silica such as a precipitated type or a gel type, obtained by the reaction of sodium silicate and mineral acids, is usually employed as a matting agent for a paint. The addition of only such silica to the black film, however, seriously affects its blackness by whitening it, though it forms a very finely roughened film surface of low gloss. Moreover, it is not expected to make the film satisfactorily resistant to staining by fingerprints, i.e. anti-fingerprint property, since the silica particles protruding from the film surface render the film hydrophilic, and the sweat adsorbed by any portion of its surface having fingerprints left thereon gives that portion a color which looks darker than that of the remaining portion.

We have, therefore, studied the possibility of forming a black film of low gloss and improved resistance to staining by fingerprints, and found it possible to obtain such a black film by adding a specific proportion of particles of an organic resin, preferably ones having a specific range of average diameter, as a matting agent. We have also found that the use of fine particles of an inorganic material, such as silica, and a solid lubricant, such as a fluororesin, with the organic resin particles is more effective for lowering the gloss of a black film and improving its resistance to staining by fingerprints, while not seriously affecting its blackness. Moreover, we have found that the use of fine particles of silica such as a precipitated type and a gel type, obtained by the reaction of sodium silicate and mineral acids, and particles of a fluorine compound as a solid lubricant makes it possible to form a particularly good matted black steel sheet having a greatly improved resistance to staining by fingerprints.

Examples of the organic resins of which the particles can be used for the purpose of this invention are urethane, silicone, epoxy, amino, acrylic, acrylonitrile, acryl-urethane, polyamide, polyester, and polypropylene resins. Although it is possible to use transparent particles (a white powder), it is more desirable to use particles blackened by a black pigment, such as carbon black, or by a black dye, so that they can lower the gloss of a black film without affecting its blackness at all.

Examples of the commercially available urethane resin particles are BURNOCK CFB100 (transparent) and BURNOCK CFB600C (black) of Dai-Nippon Inks of Chemicals, Inc. Examples of the silicone resin particles are TOSPEARL 103, 105, 108, 120, 130, 145, 3120 or 240 (white) of Toshiba Silicone Co., Ltd.

Examples of the amino resin particles are EPOSTAR S, S6, S12, L15, MS or M30 (white), and EPOCOLOR BP1002, BP1004, BP1008 or BP1015 (black) of Japan Catalyst Co., Ltd., which are the condensation products of benzoguanamine or melamine, and formaldehyde.

Examples of the acrylic resin particles are MR-7G, MR-13G or MR-20G of Soken Chemical Co., Ltd., AR-650S (transparent), or AR-650S-C (black) of Toyo Spinning Co., Ltd., and CX0504 (black) of Japan Catalyst Co., Ltd.

Examples of the acrylonitrile resin particles are AM or A20 of Toyo Spinning Co., Ltd., and EPOSOFT EBS102 of Japan Catalyst Co., Ltd. is an example of the acryl-urethane resin particles. Examples of the polyamide resin particles are ORGASOL 2002 (nylon 12) UL-D or EX-D, and ORGASOL 1002 (nylon 6) D, of ATOCHEM S.A.

The organic resin particles are used in the proportion of 1 to 150, preferably 10 to 100, parts by weight for 100 parts by weight of base resin. If their proportion is smaller than one part by weight, the particles do not produce any satisfactory matting effect. If their proportion exceeds 150 parts by weight, they make the black film composition too viscous to be easily applicable, and the sedimentation of the particles in the composition disables the formation of any stable film.

The organic resin particles preferably have an average diameter of 0.1 to 30 microns. If their average diameter is smaller than 0.1 micron, the particles hardly produce any matting effect. If it exceeds 30 microns, the particles are almost entirely exposed on the surface of the black film, insofar as the film has a thickness not exceeding five microns, and the particles, therefore, come off the film surface easily, resulting in the low scratch resistance of the film and the low spot weldability of the steel sheet.

More preferably, the organic resin particles have an average diameter of 1 to 25 microns. If their average diameter is smaller than one micron, the particles do not produce any satisfactorily improved resistance to staining by fingerprints. It is preferable that the particles have an average diameter of at least two microns, or more preferably of at least four microns, to achieve a remarkably improved resistance to staining by fingerprints. If their average diameter exceeds 25 microns, the particles lower the hiding power of the film and impairs its blackness by whitening it. It is preferable from the standpoint of its blackness that the particles have an average diameter not exceeding 15 microns, or more preferably not exceeding 10 microns. FIG. 1 shows the range of the average diameter of the organic resin particles which is preferred in connection with the resistance of the black film to staining by fingerprints, as hereinabove stated.

The black film preferably further contains a solid lubricant which improves its matte finish and lubricating property. The following is a list of examples of the materials which can be employed as the solid lubricant for the purpose of this invention:

(a) Hydrocarbon compounds:
  Polyolefin wax and paraffin wax;
(b) Fluororesins:
  Polytetrafluoroethylene, polyvinyl fluoride, polyfluoroethylene, and polyvinylidene fluoride resins;
(c) Fatty acid amides:
  Stearic acid amide, palmitic acid amide, methylenebisstearoamide, ethylenebisstearoamide, oleic acid amide, ethyl acid amide, and alkylenebis fatty acid amide;
(d) Metallic soaps:
  Calcium stearate, lead stearate, calcium laurate, and calcium palmitate;
(e) Molybdenum disulfide; and
(f) Others:
  Graphite, graphite fluoride, boron nitride, polyalkylene glycols, grease, and alkali metal sulfates.

Examples of the commercially available polyethylene wax which can be employed as the solid lubricant include SANWAX 151P, 171P or 165P of Sanyo Chemical Co., Ltd., and examples of the paraffin wax include HNP-11 of Japan Wax Refining Co., Ltd. Examples of the polytetrafluoroethylene (PTFE) resins include HOSTAFLON TF9205 of Hoechst, SST-1MG of Shamrock, and L-5 of Daikin Industrial Co., Ltd. The use of a fluororesin (e.g. PTFE) is, among others, preferred from the standpoints of effective matting and improved resistance to staining by fingerprints.

The solid lubricant is used in the proportion of 1 to 100, preferably 10 to 60, parts by weight for 100 parts of base resin. If its proportion is smaller than one part by weight, it does not produce any satisfactory matting effect. If its proportion exceeds 100 parts by weight, it makes the black film composition too viscous to be easily applicable, and lowers the blackness of the black film to the extent affecting its appearance seriously.

The black film may further contain fine particles of an inorganic material as its matting agent. Silica is the most preferable inorganic pigment that can be used for the purpose of this invention, since it has both a matting action and a rust-inhibiting action. It is also possible to use for the same purpose a sparingly soluble chromic acid salt, an extender pigment such as diatomaceous earth, calcium carbonate, talc or mica, carbon black, etc. The sparingly soluble chromic acid salt is preferably employed, as it enables a greatly improved corrosion resistance, though it may not be a very effective matting agent, and if it is used with silica, it is possible to obtain still improved results.

Examples of the appropriate commercially available silica include fumed silica, such as AEROSIL 130, 200, 300, 380, R972, R811, R805 or R974 of Nippon Aerozile Co., Ltd., colloidal silica, such as MA-ST, IPA-ST, IBA-ST, EG-ST, XBA-ST, ETC-ST or DMAC-ST of Nissan Chemical Industrial Co., Ltd., silica of a precipitated type, obtained by the reaction of sodium silicate and mineral acids, such as T-32(S), K-41 or F-80 of Tokuyama Soda Co., Ltd., and silica of a gel type, obtained by the reaction of sodium silicate and mineral acids, such as SYLOID 244, 150, 72 or 65, SHIELDEX of Fuji Davison Chemical Co., Ltd. It is also possible to use a mixture of two or more kinds of silica.

The appropriate sparingly soluble chromic acid salts includes barium chromate ($BaCrO_4$), strontium chromate ($SrCrO_4$), lead chromate ($PbCrO_4$), zinc chromate ($ZnCrO_4 \cdot 4Zn(OH)_2$), calcium chromate ($CaCrO_4$), potassium zinc chromate ($K_2O \cdot 4ZnO \cdot 4CrO_3 \cdot 3H_2O$), and silver chromate ($AgCrO_4$).

The fine inorganic particles are used in the proportion of 1 to 100, preferably 10 to 60, parts by weight for 100 parts by weight of base resin. If their proportion is smaller than one part by weight, the particles do not produce any satisfactory matting result, nor do they produce any satisfactory rust-inhibiting result if they are of silica. If their proportion exceeds 100 parts by weight the particles make the black film composition too viscous to be easily applicable, and greatly lower the blackness of the black film, thereby giving it a very poor appearance.

The addition of the fine inorganic particles, or solid lubricant, or both to the black film containing the organic resin particles makes it possible to reduce the gloss of the film effectively without lowering its blackness very much, and also enables a great improvement in its corrosion resistance and lubricating property (or press formability).

The black film may, moreover, contain at least either silica such as a precipitated type or a gel type, obtained by the reaction of sodium silicate and mineral acids, or particles of a fluorine compound, or preferably both, with the organic resin particles having an average diameter of 1 to 25 microns. The film containing them has a still improved resistance to staining by fingerprints, and is less gloss than any film not containing any of them. The combination of the organic resin particles, and the silica such as a precipitated type or a gel type, or the particles of a fluorine compound, or both enables the formation of a matted black film which is excellent in blackness and resistance to staining by fingerprints, and which permits welding.

Those components of the black film contribute greatly to improving its resistance to staining by fingerprints, apparently for the reasons which will be set forth below.

The black film composition containing the organic resin particles dispersed therein flows and contracts along the particles to form a black film having a rough surface. The particles give the film a high resistance to staining by fingerprints if they have an average diameter of at least one, preferably two, or more preferably four microns, as hereinabove stated. The presence of the particles having an appropriate average diameter as stated above is effective for two reasons. Firstly, the fingers contacting the film contact only the projections formed on its surface by the particles, or in other words, a smaller surface area on the film having a rough surface than on a film having a smooth surface, and are, therefore, less likely to leave fingerprints on the film having a rough surface. Secondly, the particles cause one portion of the film having fingerprints left thereon and another portion not having any fingerprint left thereon to reflect and scatter light substantially to the same extent, so that the fingerprints may not easily be visible. From the standpoint of blackness, however, it is necessary, as hereinbefore stated, that the particles have an average diameter not exceeding 25, preferably 15, or more preferably 10, microns, since larger particles whiten the black film having a small thickness not exceeding five microns. Even the particles having a limited average diameter as stated, however, impair the blackness of the film to a certain extent, since its surface consist of portions having projections formed by the particles and smooth recessed portions lacking any particle, and its thickness has, therefore, a microscopically small variation from one portion to another.

If particles of silica such as a precipitated type or a gel type, obtained by the reaction of sodium silicate and mineral acids, or a fluorine compound, or both are employed with the organic resin particles, however, they finely roughen the smooth recessed portions of the film between the organic resin particles; and thereby reduce its gloss and improve its resistance to staining by fingerprints. Moreover, they roughen the film surface uniformly, and make the film less likely to have any microscopically small variation in thickness than a film not containing any particles of silica or a fluorine compound is. Thus, the use of particles of silica or a fluorine compound, or both, with the organic resin particles, enables the black film to have an excellently black and matted surface.

Examples of the silica of a precipitated type, obtained by the reaction of sodium silicate and mineral acids, such as T-32(S), K-41 or F-80 of Tokuyama Soda Co., Ltd., and P-510, P-527 or P-802 of Mizusawa Chemical Industrial Co., Ltd., and silica of a gel type, obtained by the reaction of sodium silicate and mineral acids, such as 244, 150, 404 or 620 of Fuji Davison Chemical Co., Ltd., and P-78 or P-707 of Mizusawa Chemical Industrial Co., Ltd. It is also possible to use a mixture of two or more such or other products of silica.

The silica is used in the proportion of 1 to 30, preferably 5 to 20, parts by weight for 100 parts by weight of base resin. If its proportion is smaller than one part by weight, it does not satisfactorily improve the resistance of the film to staining by fingerprints. Even if its proportion may exceed 30 parts by weight, it is not expected to produce any correspondingly improved result.

Examples of the appropriate commercially available particles of fluorine compounds include particles of polytetrafluoroethylene, such as HOSTAFLOW TF9202 or TF9205 of Hoechst, SST-1MG, SST-2, or SST-3 of Shamrock, L-2 or L-5 of Daikin Industrial Co., Ltd., and MP1200 or MP1300 of Mitsui-Du Pont Fluorochemical Co., Ltd., particles of a tetrafluoroethyleneethylene copolymer, such as EP-610 of Daikin Industrial Co., Ltd. and particles of a tetrafluoroethylene-perfluoroalkyl vinyl ether copolymer, such as Teflon 34aJ of Mitsui-Du Pont Fluorochemical Co., Ltd.

The particles of a fluorine compound are used in the proportion of 1 to 40, preferably 10 to 30, parts by weight for 100 parts by weight of base resin. If their proportion is smaller than one part by weight, they do not satisfactorily improve the resistance of the film to staining by fingerprints. Even if their proportion may exceed 40 parts by weight, they are not expected to produce any correspondingly improved result.

The addition of both silica and particles of a fluorine compound is particularly effective for improving the resistance of the black film to staining by fingerprints without impairing its blackness.

Although the matted black film containing organic resin particles having an average diameter of 1 to 25 microns, silica such as a precipitated type or a gel type, obtained by the reaction of sodium silicate and mineral acids, and particles of a fluorine compound as hereinabove described have all of the necessary properties, the addition of polyethylene or paraffin wax, or both as the solid lubricant improves the self-lubricating property of the black film which facilitates the work of shaping the steel sheet by a press. Moreover, the addition of a sparingly soluble chromic acid salt, or fumed silica, or both as a rust-inhibitive pigment improves the corrosion resistance of any portion of the steel sheet that has been shaped by a press.

The solid lubricant, which may consist of polyethylene or paraffin wax, or both, is used in the proportion of a total of 1 to 40, or preferably 10 to 30, parts by weight for 100 parts by weight of base resin. If its proportion is smaller than one part by weight, the solid lubricant does not effectively improve the lubricating property of the black film. If its proportion exceeds 40 parts by weight, it undesirably affects the blackness of the film.

The rust-inhibitive pigment, which may consist of a sparingly soluble chromic acid salt, or fumed silica, or both, is used in the proportion of a total of 1 to 40, preferably 10 to 30, parts by weight for 100 parts by weight of base resin. If its proportion is smaller than one part by weight, the rust-inhibitive pigment does not produce any satisfactory result of rust inhibition. If its proportion exceeds 40 parts by weight, it is not expected to produce any correspondingly improved result, but undesirably affects the appearance of the black film. The rust-inhibitive pigment may consist of two or more substances.

The black film may further contain another black pigment (inorganic or organic), or dye if it is required to control the color tone of the film exquisitely as desired.

The addition of fine particles of carbon black as hereinabove stated is not only effective for regulating the gloss of the black film, but also gives a certain variation to its blackness. The addition of a color pigment, or dye other than a black one gives the film a delicately controlled color tone, for example, a reddish or bluish black color.

The black film as hereinabove described can be formed from a composition diluted with a solvent if required, by a process which includes applying the composition onto a steel sheet by e.g. roll squeezing or coating, or air-knife coating to form a film of appropriate thickness, and baking it by heating the sheet to a temperature of 80° C. to 300° C., preferably 120° C. to 250° C. While ordinary methods can generally be employed for the application and baking of the composition, it is a great advantage of this invention that the black film can be formed by employing the coating equipment which iron and steel manufacturers usually have for producing surface treated steel sheets of high corrosion resistance.

As is obvious from the foregoing, this invention provides a black steel sheet which is weldable, since its black film has a thickness not exceeding five microns, which is smaller than that of the black film on any conventionally available black steel sheet, and yet which has an excellently black surface of low gloss resisting easily visible staining by fingerprints. The black film on the black steel sheet of this invention is also excellent in adhesive strength, formability, corrosion resistance and light fastness. Moreover, the black steel sheet of this invention, which can be manufactured by employing existing coating and baking equipment including a roll coater, can be manufactured by a process of greatly improved productivity which is free from any problem as has been encountered by any conventional black steel sheet made by a method relying upon reaction or etching as a result of the deterioration of the black film composition by the dissolution of the plating material on the base sheet.

The black steel sheet of this invention has a particularly high level of light fastness if its black film contains a solvent-soluble black metal complex of azo dye. It exhibits a particularly high level of corrosion resistance, as well as light fastness, if the dye is a salt of chromium.

The black film which contains a solvent-soluble black azo dye not in the form of a complex metal salt, or a solventssoluble black azine dye is somewhat inferior in light fastness to that which contains a solvent-soluble black metal complex of azo dye, but does not present any problem if it is used to make a black steel sheet material for any article for indoor use, such as a domestic electrical appliance. Moreover, the former dyes are about 20 to 50% less expensive than the latter, and the use thereof enables a corresponding reduction in the cost of the black film composition.

The black film has a particularly good matte finish and a particularly high level of resistance to staining by fingerprints if it contains particles of an organic resin having a specific range of average diameter, and at least either silica such as a precipitated type or a gel type, obtained by the reaction of sodium silicate and mineral acids, or particles of a fluorine compound.

Description will now be made of a black steel sheet having a chromate film and a black film on one side thereof, and only a chromate film on the other side. For the chromate and black films on one side of the sheet, reference is made to the foregoing description, and the following is primarily a description of the chromate film on the other side of the sheet.

The composition of the chromate film on the other side of the sheet may be equal to, or different from, that of the chromate film on one side of the sheet. For example, the chromate films on both sides of the sheet may be the products of the same composition which are formed by reaction, electrolysis or coating. On the other hand, the chromate film on the other side of the sheet may be formed by coating its surface with a solution of the composition containing silica, an aqueous resin, etc. and giving the film particularly good properties, while the chromate film on one side of the sheet is formed by coating its surface with a solution of any appropriate composition, in the event, for example, that the products of this invention is intended for use as a material for a part of any article without being given any paint finish.

Although the composition of the chromate film has generally been described before, it is particularly preferable that the chromate film on the other side of the sheet, i.e. not carrying any black film thereon, be formed by coating its surface with one of the chromating solutions which are described at (1) to (4) below:

(1) A chromating solution containing hexavalent and trivalent chromium ions in a weight ratio of 40/60 to 80/20;

(2) A chromating solution containing hexavalent and trivalent chromium ions, and a silica sol, the hexavalent and trivalent chromium ions having a weight ratio of 40/60 to 80/20, and the colloidal silica and the total of the chromium ions having a weight ratio of $\frac{1}{2}$ to 8/1;

(3) A chromating solution containing hexavalent and trivalent chromium ions in a weight ratio of 40/60 to 80/20;

(4) A chromating solution containing hexavalent and trivalent chromium ions, a colloidal silica and an aqueous resin, the hexavalent and trivalent chromium ions having a weight ratio of 40/60 to 80/20, the colloidal silica and the total of the chromium ions having a weight ratio of $\frac{1}{2}$ to 8/1, and the aqueous resin and the total of the chromium ions having a weight ratio of 1/20 to 40/1; the proportions of the hexavalent and trivalent chromium ions, and the total thereof being based on the weight of metallic chromium.

Referring in further detail to the preferred chromating solutions, the hexavalent and trivalent chromium ions in each solution have a weight ratio of 40/60 (hexavalent/trivalent) to 80/20. This ratio has a critical bearing on the corrosion resistance of the chromate film and the fixation of chromium therein. If the proportion of the hexavalent chromium ions is larger than 80, while that of the trivalent ones is smaller than 20, there is formed a chromate film containing a large amount of hexavalent chromium ions, which are easily soluble in water, even if the steel sheet coated with the solution may be dried at a temperature of 70° C. to 250° C., and the film, therefore, contains a low percentage of fixed chromium after degreasing with alkali. If the proportion of the hexavalent chromium ions is smaller than 40, while that of the trivalent ones is larger than 60, there is formed a chromate film containing too small an amount of hexavalent chromium ions to be satisfactorily high in corrosion resistance, though it may,contain a higher percentage of fixed chromium after degreasing with alkali, and moreover, the drying of the steel sheet coated with the solution at a temperature of 70° C. to 250° C. results in the chromate film which is too hydrophilic, i.e. easily combines with water molecules, to be satisfactorily high in resistance to staining by fingerprints.

Although no definte reason has been ascertained for the high hydrophilicity of the chromate film formed from the solution containing the hexavalent chromium ions in the proportion which is smaller than 40, it is probably due to the fact that, while the combination of the hexavalent chromium ions with the hydrophilic silanol groups in silica particles lowers the hydrophilicity of the chromate film, the smaller proportion of the hexavalent chromium ions results in the increase of the silanol groups which do not combine with hexavalent chromium ions.

It is preferable to use a solution containing hexavalent and trivalent chromium ions in a weight ratio of 50/50 to 75/25 to form a chromate film which is further improved in sparing solubility, corrosion resistance and resistance to staining by fingerprints.

An aqueous solution containing hexavalent and trivalent chromium ions can be prepared by reducing a part of hexavalent chromium ions in an aqueous solution of chromic anhydride ($CrO_3$) to trivalent chromium ions with a reducing agent, such as cane sugar, glycol, starch, methanol, ethanol, or oxalic acid.

The solution which further contains a colloidal silica ($SiO_2$) gives a chromate film which is further improved in corrosion resistance, and in resistance to staining by fingerprints, if the colloidal silica and the total of the hexavalent and trivalent chromium ions have a weight ratio of $\frac{1}{2}$ (colloidal silica/chromium ions) to 8/1. If the proportion of the colloidal silica is smaller than 1, or if that of the chromium ions is larger than 2, there is not obtained any chromate film that is appreciably improved in corrosion resistance, or resistance to staining by fingerprints. If the proportion of the colloidal silica is larger than 8, or if that of the chromium ions is smaller than 1, there is formed a chromate film which is too hydrophilic to be satisfactorily high in resistance to staining by fingerprints, and to which sweat easily adheres to make fingerprints left thereon clearly visible, and which has, moreover, too high an electrical resistance for the proper weldability of the steel sheet. It is preferable to use a solution containing the colloidal silica and the chromium ions in a weight ratio of 1/1 to 7/1 to ensure the formation of a chromate film having still higher levels of corrosion resistance and resistance to staining by fingerprints.

The colloidal silica is easier to disperse in the chromating solution without undergoing any substantial cohesion than a powder of fumed silica is. Therefore, the solution containing the colloidal silica forms a chromate film which is superior in corrosion resistance and resistance to staining by fingerprints to any film formed from a solution containing a powder of fumed silica. The colloidal silica can be prepared from water glass, or an aqueous solution of sodium silicate by a process such as ion exchange, or electrical dialysis. Snawtex O and Snawtex OL of Nissan Chemical Industries, Ltd. are examples of the commercially available colloidal silica.

The solution which contains an aqueous resin gives a chromate film which has an improved resistance to staining by fingerprints, and which improves the scratch resistance and press formability of the steel sheet. The term "aqueous resin" as herein used means water-dispersible resin particles which are stable when dispersed in the chromating solution. Examples of the appropriate resins are polyester, acrylic, alkyd, vinyl, silicone, and latex resins. The appropriate solution contains the aqueous resin and the hexavalent and trivalent chromium ions in a weight ratio of 1/20 (aqueous resin/chromium ions) to 40/1. If the proportion of the aqueous resin is smaller than 1/20 of that of the chromium ions, it is not expected to produce any satisfactorily improved resistance to staining by fingerprints, scratch resistance, or press formability. Even if its proportion may be larger than 40 times that of the chromium ions, it is not expected to produce any correspondingly improved result.

The solution may further contain trivalent $PO_4$ ions and divalent zinc ions which improve the sparing solubility of the chromate film. The solution may contain those ions in such proportions that the trivalent $PO_4$ ions and the total chromium ions may have a weight ratio of 1/30 ($PO_4$/chromium) to 2/1, and that the divalent zinc ions and the hexavalent chromium ions may have a weight ratio of 1/40 (zinc/chromium) to $\frac{2}{3}$.

If the proportion of the trivalent $PO_4$ ions is smaller than 1/30 of that of the chromium ions, they are not expected to improve the sparing solubility of the chromate film remarkably. If their proportion is larger than twice that of the chromium ions, the solution has a lower pH value and a higher etching property which accelerate its aging and also disable the formation of a chromate film having a satisfactorily high resistance to staining by fingerprints.

If the proportion of the divalent zinc ions is smaller than 1/40 of that of the hexavalent chromium ions, there is not expected any appreciable improvement in the sparing solubility of the chromate film. If their proportion is larger than $\frac{2}{3}$ of that of the chromium ions, there is formed a sediment in the solution.

Whichever solution may be employed, it is so prepared as to have an appropriate concentration, is applied onto the steel sheet by e.g. roll squeezing or coating, and is dried by heating the sheet to a temperature of 70° C. to 300° C. If the drying temperature is lower than 70° C., no appreciable improvement is expected in the fixation of chromium in the chromate film. If it is higher than 300° C., no additional improvement is expected in the fixation of chromium, but the chromate film may crack and have a lower corrosion resistance.

The chromate film on the other side of the steel sheet is so formed as to have a coating weight of 10 to 120 mg/m² in terms of metallic chromium. If its coating weight is smaller than 10 mg/m² it does not exhibit any appreciably improved corrosion resistance. If its coating weight is larger than 120 mg/m², it is impossible to expect any improved fixation of chromium after degreasing with alkali.

The black steel sheet of this invention carrying a black film only on one side thereof is particularly high in weldability, since it carries only on one side thereof the black film having a thickness not exceeding five microns which is smaller than that of the black film on any conventionally available black steel sheet. Moreover, it has an excellently black surface of low gloss resisting easily visible staining by fingerprints. The black film on the black steel sheet of this invention is also excellent in adhesive strength, formability, corrosion resistance and light fastness. Moreover, the black steel sheet of this invention, which can be manufactured by employing existing coating and baking equipment including a roll coater, can be manufactured by a process of greatly improved productivity which is free from any problem as has been encountered by any conventional black steel sheet made by a method relying upon reaction or etching as a result of the deterioration of the black film composition by the dissolution of the plating material on the base sheet.

If the steel sheet has a surface coated with a chromate film of the specific composition on the other side thereof not carrying any black film thereon, it exhibits particularly high levels of resistance to staining by fingerprints and corrosion resistance. These properties, and the excellent weldability of the sheet as hereinabove stated, make it very useful as a material for making domestic electrical appliances, etc.

The invention will now be described in further detail with reference to specific examples.

EXAMPLE I

Black steel sheets embodying this invention and comparative black steel sheets were prepared as materials for electrical appliances, or office machines or furniture. Each black steel sheet was prepared from a steel sheet plated with zinc or a zinc alloy. After it had been degreased with an alkali, rinsed with water, and dried, a chromate film was formed on each side of the sheet by coating it with a chromating solution by a roll coater, or by subjecting it to electrolysis in an electrolytic chromating bath. After they had been dried, the chromate films on both sides of the sheet were coated with a resin solution by a roll coater, and the resin films formed thereon were dried, heated, and air cooled to form black surfaces on both sides of the sheet.

The following is a more detailed description of the formation of the chromate films by coating or electrolysis:

(1) Coating (i.e. Dryed-in-place):

The chromating solution contained trivalent and hexavalent chromium ions in a weight ratio of 2:3, and had a pH of 2.5 (after adjustment by KOH), and a solid content of 20 grams per liter. The solution was applied by the roll coater onto the steel sheet at ordinary room temperature, and dried.

(2) Electrolysis:

The bath contained 50 g of $CrO_3$ and 0.5 g of $H_2SO_4$ per liter, and had a temperature of 50° C. The films were formed by cathodic treatment using a current density of 4.9 $A/dm^2$ and an electrolyzing time of 20 seconds, and were rinsed with water, and dried.

TABLES 1 to 3 show the starting sheet materials, and the base resins and blackening agents used for forming black films, as employed in Examples 1 to 7 which will hereinafter be described. TABLES 4 to 6 show the additives as employed in Examples 1 to 3, and TABLES 19 to 23 show the additives as employed in Examples 4 to 7.

TABLES 7 to 18 and 24 to 41 show the starting sheet materials employed, the chromate films formed thereon, the compositions used for forming the black films thereon, and the results of the tests conducted on the black steel sheets as thereby obtained. The black film compositions had been prepared by mixing the constituents thereof as shown in TABLES 2 to 6 and 19 to 23 in the proportions as shown in TABLES 7 to 18 and 24. to 41, and diluted with a solvent as required.

The following is a description of the tests conducted for the evaluation of the black steel sheets:

(1) Blackness:

The multiple light source spectrophotometer (Model MSC) of Suga Test Instruments Co., Ltd. was used to determine the L value of the black film on each steel sheet as a measure of its blackness. The results are shown in the tables by the symbols as defined below:
 ⊙: $L_=15$;
 o+: $15 L_=20$;
 o: $20 L_=25$;
 o−: $25 L_=30$;
 x : $L 30$.

(2) Specular gloss (JIS Z8741-1983)

The gloss meter of Suga Test Instruments Co., Ltd. was used to determine the specular gloss of the surface of each sample at the incident and reflecting angles of 60°. The results are shown by numerical values. The larger the value, the higher the gloss.

(3) Weldability:

Spot welding was done on each sample under the conditions listed below and the number of continuously formed weld spots was counted as a measure of its weldability:
 Electrode: Cr-Cu, D type;
 Electrode diameter: 6 mm;
 Welding current: 10 kA;
 Welding pressure: 200 kg;
 Welding time: 12 cycles/60 Hz.

The results are shown by the symbols:
 ⊙: 500 or more spots;
 o: 100 or more spots;
 x: Less than 100 spots.

(4) Corrosion Resistance of Flat and Formed Portions:

A salt spray test conforming to the requirements of JIS Z-2371 was conducted for a maximum of 240 hours on a flat portion of each sample and on an extruded portion formed on each sample by an Erichsen tester and having a height of 7 mm. The corrosion resistance of each such portion was judged by the length of time which had passed without allowing the formation of any white rust covering 5% by area of its surface. The results are shown by the symbols as defined below:
 ⊙: No white rust was formed;
 o+: More than 120 hours, but not more than 240 hours;
 o : More than 48 hours, but not more than 120 hours;
 Δ: More than 24 hours, but not more than 48 hours;
 x : Not more than 24 hours.

(5) Adhesive Strength of Black Film:

Lines having a spacing of 1 mm from one another were cut in the black film on each sample to form 100 squares in a checkered pattern, and an adhesive tape was bonded to, and removed from the checkered film to see how it would peel off with the tape. The results are shown by the symbols as defined below:
 ⊙: No peeling occurred;
 o : Less than 10% of the film peeled off;

Δ: 10% or more, but less than 20% peeled off;
x : More than 20% peeled off.

(6) Formability:

Each sample was hat drawn by an extrusion of 5 mm. through a 50 mm dia. die with a 90 mm dia. blank, and an adhesive tape was bonded to, and removed from the drawn portion of the sample to see how the black film thereon would peel off with the tape, and change in appearance. The results are shown by the symbols as defined below:

⊚: There was no peeling of the film in powder;
o+: There was some local peeling of the film in powder, but there was substantially no change in its appearance;
o : There was some peeling blackening the tape slightly, but there was substantially no change in the appearance of the film;
o−: The peeling of the film resulted in some blackening of the tape and some whitening of the film;
Δ: The peeling of the film resulted in the remark able blackening of the tape and the remarkable whitening of the film;
x : The complete peeling of the film resulted in the heavy blackening of the tape.

(7) Light Fastness:

The black film on each sample was exposed to light by a fadeometer in accordance with the Second Light Exposure Method as specified by JIS L-0842, and its fade resistance was ranked in accordance with the Blue Scale. The results are shown by the symbols as defined below:

⊚: Grade 7 or 8 (of the Blue Scale);
o : Grade 5 or 6;
Δ: Grade 3 or 4;
x : Grade 1 or 2.

(8) Resistance to Staining by Fingerprints (i.e. Antifingerprint Property)

Fingerprints were left on the black film on each sample and a visual inspection was made of its surface to see whether the fingerprints were clearly visible. The results are shown by the symbols as defined below:

⊚: Not clearly visible;
o+: Hardly clearly visible;
o : Somewhat clearly visible;
x : Clearly visible.

EXAMPLE 1

This example was intended for examining the effects which different blackening agents and organic resin particles, and different proportions thereof, as employed in black films, might have on the properties of black steel sheets, i.e. blackness, gloss, weldability, formability, adhesive strength, corrosion resistance, resistance to staining by fingerprints, and light fastness. Further details of the samples which were prepared, and the results of their evaluation are shown in TABLES 7 to 12. The results confirm that the black films containing organic resin particles have a lower level of luster and an improved resistance to staining by fingerprints, as is obvious from their comparison with Comparative Sample 8.

EXAMPLE 2

This example was intended for examining the effects which the addition of a solid lubricant and fine inorganic particles to black films, and their proportions might have on the properties of black steel sheets. Further details of the samples and the results of their evaluation are shown in TABLES 13 to 16. The results confirm that the black films containing not only organic resin particles, but also a solid lubricant and fine inorganic particles have an improved resistance to staining by fingerprints.

EXAMPLE 3

This example was intended for examining the effects which different starting materials, different base resins, different chromate film, different coating weights thereof, and different baking temperatures might have on the properties of black steel sheets. Further details of the samples and the results of their evaluation are shown in TABLES 17 and 18.

EXAMPLES 4 TO 7

These examples were intended for preparing samples of black steel sheets coated with black films containing organic resin particles having specific average diameters, and either or both silica such as a precipitated type or a gel type, obtained by the reaction of sodium silica and mineral acids, and particles of a fluorine compound, and examining the effects which different additives and proportions might have on the properties of the black steel sheets. Further details of the samples and the results of their evaluation are shown in TABLES 24 to 41.

The following is a further explanation of the tables:
*1 : See TABLE 1;
*2: See TABLE 2;
*3: See TABLE 3;
*4: Parts by weight for 100 parts by weight of base resin;
*5: See TABLE 4;
*6: Parts by weight for 100 parts by weight of base resin;
*7: See TABLE 5;
*8: Parts by weight for 100 parts by weight of base resin;
*9 : See TABLE 6;
*10: Parts by weight for 100 parts by weight of base resin;
*11: See TABLE 1;
*12: See TABLE 2;
*13: See TABLE 3;
*14: Parts by weight for 100 parts by weight of base resin;
*15: See TABLE 19;
*16: Parts by weight for 100 parts by weight of base resin;
*17: See TABLE 20;
*18: Parts by weight for 100 parts by weight of base resin;
19: See TABLE 21;
*20: Parts by weight for 100 parts by weight of base resin;
*21: See TABLE 22;
*22: Parts by weight for 100 parts by weight of base resin;
*23: See TABLE 23;
*24: Parts by weight for 100 parts by weight of base resin.

EXAMPLE II

Black steel sheets embodying this invention and comparative black steel sheets, each having a black film formed only on one side thereof, were prepared as materials for, among others, domestic electrical appliances, or office machines or furniture. Each sample was prepared from a steel sheet plated with zinc or a zinc alloy. After it had been degreased with an alkali, rinsed with water, and dried, a chromate film and a black film were formed on one side of the sheet, and only a chromate film on the other side thereof, by employing one of the processes as described at (1) to (3) below:

(1) Forming chromate films on both sides of the sheet by reaction—rinsing with water—drying—forming a black film on one side thereof by coating—baking under heat;

(2) Forming chromate films on both sides of the sheet by electrolysis—rinsing with water—drying—forming a black film on one side thereof by coating —baking under heat; and (3) Forming a chromate film on one side of the sheet by coating—forming a chromate film on the other side thereof by coating—drying—forming a black film on one side thereof by coating—baking under heat.

See the relevant tables for the details of the starting sheet materials, and the base resins, blackening agents, and other materials employed for forming the black films.

EXAMPLE 1

Each sample was prepared by forming chromate films on both sides of the starting sheet material by reaction, electrolysis or coating, forming a black film on the chromate film on one side of the sheet, and curing it under heat. Each sample having a black film formed only on one side thereof was tested for spot weldability. Further details of the samples and the results of their weldability are shown in TABLES 42 and 43.

The following is a more detailed description of the formation of the chromate films by reaction, electrolysis or coating:

(1) Reaction (i.e. Reacted-in-place):

A solution containing 10 g of $CrO_3$, 2 g of $H_2SO_4$, 2 g of trivalent chromium ions and 3 g of divalent zinc ions per liter was held at a temperature of 50° C., and sprayed onto the steel sheet for five seconds, whereafter it was rinsed with water, and dried. The amount of free oxygen in the solution was controlled to adjust the coating weight, or chromium content of the chromate film.

(2) Electrolysis:

Cathodic treatment was carried out in a bath of a solution containing 50 g of $CrO_3$ and 0.5 g of $H_2SO_4$ per liter and having a temperature of 50° C. by using a current density of 4.9 $A/dm^2$ and an electrolyzing time of 20 seconds, whereafter the sheet was rinsed with water, and dried.

(3) Coating (i.e. Dryed-in-place):

A solution having the composition shown below was applied onto the sheet by a roll coater, and dried by heating the sheet to a temperature of 100° C. without rinsing with water:

Hexavalent chromium ions/trivalent chromium ions =70/30;
$SiO_2$/ total chromium ions=4/1;
Trivalent $PO_4$ ions/total chromium ions=0;
Divalent zinc ions/hexavalent chromium ions=0.

The solid concentration of the solution and the conditions for roll coating were controlled to regulate the coating weight, or chromium content of the chromate film.

Each test for spot weldability was conducted by laying two samples on each other so that the black film on one sample might contact the chromate film on the other. The test was conducted under the conditions indicated below, and the number of continuously formed weld spots was counted as a measure of weldability:

Electrode : Cr-Cu, DR type;
Electrode diameter: 6 mm;
Welding current: 10 kA;
Welding pressure: 200 kg;
Welding time: 12 cycles/60 Hz.

The results are shown by the symbols as defined below:

o: 700 or more spots;
o: 200 or more spots;
x: Less than 200 spots.

For the understanding of *1 to *24 in the tables, see the explanation given in the description of EXAMPLE I above.

EXAMPLE 2

Each sample was prepared by forming a chromate film and a black film by coating on one side of the steel sheet, and a chromate film by coating on the other side thereof. The chromate film on the other side of each sample was formed from a solution having a different composition from that used for forming the chromate film on one side thereof. Each sample was evaluated for spot weldability, and the chromate film on the other side thereof was evaluated for corrosion resistance, chromium fixation, and resistance to staining by fingerprints.. Further details of the samples are shown in TABLES 44 and 45, and the results of their evaluation in TABLES 46 and 47.

The following information supplements TABLES 44 and 45:

(A) Chromate and Black Films on One Side:

(a) Chromate film: Example 1 was repeated for forming the chromate film by coating. See page 75.

(b) Black film: The black film was formed from a solution containing 100 parts by weight of amine-modified epoxy resin (No. 1 in TABLE 2), 70 parts by weight of solvent-soluble black azo dye in the form of a complex metal salt (No. 1 in TABLE 3) and 60 parts by weight of amino resin particles (No. 2 in TABLE 4). It was baked at a sheet temperature of 210° C., and had a thickness of 2.0 microns.

(B) Chromate Film on the Other Side:

The chromate film on the other side of each sample was formed by coating its surface with a solution of the composition shown in TABLE 44 or 45 by a roll coater, and drying it at the sheet temperature as indicated in TABLE 44 or 45 without rinsing it with water. The solid concentration of the solution and the conditions for roll coating were controlled to regulate the coating weight, or chromium content of the chromate film.

The following is a description of the methods employed for evaluating the samples:

(1) Corrosion Resistance:

A salt spray test conforming to the requirements of JIS Z-2371 was conducted on that side of each sample on which no black film had been formed. The test was conducted on its flat surface without deforming it. Its corrosion resistance was judged by the length of time which had passed without allowing the formation of white rust covering 5% by area of its surface. The results are shown by the symbols as defined below:

o+: More than 120 hours;

o : More than 24 hours, but not more than 120 hours;
Δ: More than four hours, but not more than 24 hours;
x : Not more than four hours.

(2) Chromium Fixation:

An aqueous solution for alkali degreasing containing mainly sodium silicate and having a temperature of 60° C. (more specifically, a solution of CL-N364S of Japan Parkerizing Co., Ltd. having a concentration of 20 grams per liter) was sprayed for one minute onto the chromate film on that side of each sample on which no black film had been formed. The percentage of the chromium content of the film as degreased to that which it had had before degreasing was calculated as a measure of chromium fixation. The results are shown by the symbols as defined below:

o+: 90% or more;
o: 70% or more, but less than 90%;
Δ: 50% or more, but less than 70%;
x: Less than 50%.

(3) Resistance to Staining by Fingerprints (i.e. Antifingerprint property):

Fingers were pressed on the chromate film on that side of each sample on which no black film had been formed, and a visual inspection was made to see whether the fingerprints left thereon were clearly visible. The results are shown by the symbols as defined below:

o : Not clearly visible;
Δ: Somewhat clearly visible;

x : Very clearly visible.

(4) Weldability:

Example 1 was repeated for weldability evaluation. See pages 75 and 76.

TABLE 1

| No. | Materials |
|---|---|
| 1 | Electrogalvanized steel |
| 2 | Zn-Ni alloy electroplated steel (Ni: 12%) |
| 3 | Zn-Fe alloy electroplated steel (Fe: 25%) |
| 4 | Hot dip galvanized steel |
| 5 | Zn-SiO$_2$ composite electroplated steel |

TABLE 2

| No. | Base Resin | Designation |
|---|---|---|
| 1 | Amine-modified epoxy resin | Resin listed as No. 2 in Table 3 in Japanese Patent Application Laid-open No. 8033/1989 |
| 2 | Acryl silicon resin | ZEMLAC: Product of Kanegafuchi Chemical Industrial Co., Ltd. |
| 3 | Fluororesin | LUMIFLON LF-100: Product of Asahi Glass Co., Ltd. |
| 4 | Phenoxy resin | PHENO-TOTO: Product of Toto Chemical Co., Ltd. |

(Note)
No. 1 to 3: Thermosetting resin soluble in an organic solvent
No. 4: Thermoplastic resin soluble in an organic solvent

TABLE 3

| No. | Blacking Agent | Tradename | C.I. Generic Name |
|---|---|---|---|
| 1 | Black metal complex of azo dye soluble in an organic solvent | ORASOL Black RL (CIBA-GEIGY) | C.I. Solvent Black 29 |
| 2 | Black metal complex of azo dye soluble in an organic solvent | Aizen Spilon Black RLH Special (Hodogaya Chemical Co., Ltd.) | C.I. Solvent Black 42 |
| 3 | Black azo dye soluble in an organic solvent | Neptun Black X60 (BASF) | C.I. Solvent Black 3 |
| 4 | Black azine dye soluble in an organic solvent | Orient Nigrosine Base EX (Orient Chemical Industries, Ltd.) | C.I. Solvent Black 7 |
| 5 | Black Inorganic pigment: Carbon black | Mitsubishi Carbon Black #950 (Mitsubishi Chemical Industries, Ltd.) | — |
| 6 | Black organic pigment: Aniline black | Paliotol Black L0080 (BASF) | C.I. Pigment Black 1 |
| 7* | Black metal complex of azo dye soluble in an organic solvent | ORASOL Black RL (CIBA-GEIGY) | C.I. Solvent Black 29 |
|  | Yellow metal complex of azo dye soluble in an organic solvent | ORASOL Yellow 2GLN (CIBA-GEIGY) | C.I. Solvent Yellow 88 |
|  | Phthalocyanine dye soluble in an organic solvent | ORASOL Blue GN (CIBA-GEIGY) | C.I. Solvent Blue 67 |

*A mixture containing the three dyes in a ratio of 5:4:1.

TABLE 4

| No. | Organic Resin Particles | Tradename | Shape | Average particle diameters | Color |
|---|---|---|---|---|---|
| 1 | Particles of an amino resin (condensation product of benzoguanamine and formaldehyde) | EPOCOLOR BP-1002 (Nippon Shokubai K.K.) | Spherical | 1~3 μm | Black |
| 2 | Particles of an amino resin (condensation product of benzoguanamine and formaldehyde) | EPOCOLOR BP-1008 (Nippon Shokubai K.K.) | Spherical | 8.5 μm | Black |
| 3 | Urethane resin particles | Barnock CFB-600C (Dainippon Ink & Chemical Co., Ltd.) | Spherical | 15~25 μm | Black |
| 4 | Urethane resin particles | — | Spherical | 5~9 μm | Black |
| 5 | Acrylonitrile resin | TAFTICK AR-650 S-C (TOYOBO K.K.) | Spherical | 10 μm | Black |
| 6 | Particles of an amino resin (condensation product of melamine and formaldehyde) | EPOSTAR S12 (Nippon Shokubai K.K.) | Spherical | 1.2 μm | White (transparent) |

TABLE 5

| No. | Inorganic Pigment | Tradename |
|---|---|---|
| 1 | Silica of a gel type, obtained by the reaction of sodium silicate and mineral acids | CYROID 404 (Fuji-Davision Chemical Co., Ltd.) |
| 2 | Silica of a precipitated type, obtained by reaction of sodium silicate and mineral acids | MIZUKASIL P-526 (Mizusawa Chemical Industrial Co., Ltd.) |
| 3 | Fumed silica | AEROSIL TT600 (Nippon Aerozile Co., Ltd.) |
| 4 | Fumed silica | AEROSIL 200 (Nippon Aerozile Co., Ltd.) |
| 5 | Synthetic zeolite | SILTON B (Mizusawa Chemical Industrial Co., Ltd.) |

TABLE 6

| No. | Solid Lubricant | Tradename |
|---|---|---|
| 1 | Polytetrafluoroethylene resin (PTFE) | SST-IMG (Shamrock) |
| 2 | Polytetrafluoroethylene resin (PTFE) | LUBURON L-5 (Daikin Industrial Co., Ltd.) |
| 3 | Polyethylene wax | SANWAX 165-P (Sanyo Chemical Co., Ltd.) |

TABLE 7

<EXAMPLE 1>

| No. | | Starting sheet Material *1 | Starting sheet Coating weight (g/m²) | Chromate film Material | Chromate film Coating weight of chromium (mg/m²) | Black film Base Resin *2 | Black film Additive 1 Material *3 | Black film Additive 1 Proportion (parts) *4 |
|---|---|---|---|---|---|---|---|---|
| Sample of the invention | 1 | 1 | 20 | coating | 50 | 1 | 1 | 80 |
| | 2 | " | " | " | " | " | " | " |
| | 3 | " | " | " | " | " | " | " |
| | 4 | " | " | " | " | " | " | " |
| | 5 | " | " | " | " | " | " | " |
| | 6 | " | " | " | " | " | " | 5 |
| | 7 | " | " | " | " | " | " | 10 |
| | 8 | " | " | " | " | " | " | " |
| | 9 | " | " | " | " | " | " | 120 |
| | 10 | " | " | " | " | " | " | " |
| | 11 | " | " | " | " | " | " | " |
| | 12 | " | " | " | " | " | " | 200 |
| | 13 | " | " | " | " | " | " | " |

| No. | | Black film Additive 2 Material *5 | Black film Additive 2 Proportion (parts) *6 | Black film Additive 3 Material *7 | Black film Additive 3 Proportion (parts) *8 | Black film Additive 4 Material *9 | Black film Additive 4 Proportion (parts) *10 | Baking temp. (°C.) | Thickness (μ) |
|---|---|---|---|---|---|---|---|---|---|
| Sample of the invention | 1 | 1 | 60 | — | — | — | — | 210 | 0.3 |
| | 2 | " | " | — | — | — | — | " | 0.8 |
| | 3 | " | " | — | — | — | — | " | 1.5 |
| | 4 | " | " | — | — | — | — | " | 3.0 |
| | 5 | " | " | — | — | — | — | " | 5.0 |
| | 6 | " | 5 | — | — | — | — | " | 3.0 |
| | 7 | " | " | — | — | — | — | " | 1.0 |
| | 8 | " | " | — | — | — | — | " | 3.0 |
| | 9 | " | 10 | — | — | — | — | " | 0.3 |
| | 10 | " | " | — | — | — | — | " | 1.5 |
| | 11 | " | " | — | — | — | — | " | 3.0 |
| | 12 | " | " | — | — | — | — | " | 0.3 |
| | 13 | " | " | — | — | — | — | " | 1.5 |

TABLE 8

<EXAMPLE 1>

| No. | | Starting sheet Material *1 | Starting sheet Coating weight (g/m²) | Chromate film Material | Chromate film Coating weight of chromium (mg/m²) | Black film Base Resin *2 | Black film Additive 1 Material *3 | Black film Additive 1 Proportion (parts) *4 |
|---|---|---|---|---|---|---|---|---|
| Sample of the invention | 14 | 1 | 20 | coating | 50 | 1 | 1 | 80 |
| | 15 | " | " | " | " | " | " | " |
| | 16 | " | " | " | " | " | " | " |
| | 17 | " | " | " | " | " | " | " |
| | 18 | " | " | " | " | " | " | " |
| | 19 | " | " | " | " | " | " | " |
| | 20 | " | " | " | " | " | " | " |
| | 21 | " | " | " | " | " | " | " |
| | 22 | " | " | " | " | " | 2 | " |
| | 23 | " | " | " | " | " | 3 | " |

TABLE 8-continued

| | | | | | | | | |
|---|---|---|---|---|---|---|---|---|
| 24 | " | " | " | " | " | 4 | " | |

| | | Black film | | | | | | | |
|---|---|---|---|---|---|---|---|---|---|
| | | Additive 2 | | Additive 3 | | Additive 4 | | | |
| No. | | Material *5 | Proportion (parts) *6 | Material *7 | Proportion (parts) *8 | Material *9 | Proportion (parts) *10 | Baking temp. (°C.) | Thickness (μ) |
| Sample of the invention | 14 | 1 | 1 | — | — | — | — | 210 | 1.5 |
| | 15 | 1 | 5 | — | — | — | — | " | " |
| | 16 | 1 | 150 | — | — | — | — | " | " |
| | 17 | 2 | 60 | — | — | — | — | " | " |
| | 18 | 3 | 60 | — | — | — | — | " | " |
| | 19 | 4 | 60 | — | — | — | — | " | " |
| | 20 | 5 | 60 | — | — | — | — | " | " |
| | 21 | 6 | 60 | — | — | — | — | " | " |
| | 22 | 6 | 60 | — | — | — | — | " | " |
| | 23 | 6 | 60 | — | — | — | — | " | " |
| | 24 | 6 | 60 | — | — | — | — | " | " |

TABLE 9

*EXAMPLE 1>

| | | Starting sheet | | Chromate film | | Black film | | |
|---|---|---|---|---|---|---|---|---|
| | | | | | | Base Resin *2 | Additive 1 | |
| No. | | Material *1 | Coating weight (g/m²) | Material | Coating weight of chromium (mg/m²) | | Material *3 | Proportion (parts) *4 |
| Comparative sample | 1 | 1 | 20 | coating | 50 | 1 | 5 | 80 |
| | 2 | " | " | " | " | " | 6 | " |
| | 3 | " | " | " | " | " | 1 | 0.5 |
| | 4 | " | " | " | " | " | " | 300 |
| | 5 | " | " | " | " | " | " | 80 |
| | 6 | " | " | " | " | " | " | " |
| | 7 | " | " | " | " | " | " | " |
| | 8 | " | " | " | " | " | " | " |

| | | Black film | | | | | | | |
|---|---|---|---|---|---|---|---|---|---|
| | | Additive 2 | | Additive 3 | | Additive 4 | | | |
| No. | | Material *5 | Proportion (parts) *6 | Material *7 | Proportion (parts) *8 | Material *9 | Proportion (parts) *10 | Baking temp. (°C.) | Thickness (μ) |
| Comparative sample | 1 | 1 | 60 | — | — | — | — | 210 | 1.5 |
| | 2 | " | " | — | — | — | — | " | " |
| | 3 | " | " | — | — | — | — | " | 3.0 |
| | 4 | " | " | — | — | — | — | — | — |
| | 5 | " | 0.5 | — | — | — | — | 210 | 1.5 |
| | 6 | " | 200 | — | — | — | — | — | — |
| | 7 | " | 60 | — | — | — | — | 210 | 7.0 |
| | 8 | — | — | — | — | — | — | — | — |

TABLE 10

<EXAMPLE 1>

| | | | | | | | Corrosion resistance | | | Resistance to staining |
|---|---|---|---|---|---|---|---|---|---|---|
| No. | | Blackness (L value) | Specular gloss | Weldability | Formability | Adhesion | Flat portion | Formed portion | Light fastness | by fingerprints |
| Sample of the invention | 1 | ○— (30) | 5 | ⊙ | ○— | ⊙ | ○ | Δ | ⊙ | ○ |
| | 2 | ○— (29) | 5 | ⊙ | ○— | ⊙ | ⊙ | ○ | ⊙ | ○ |
| | 3 | ○ (25) | 5 | ⊙ | ○— | ⊙ | ⊙ | ○ | ⊙ | ○ |
| | 4 | ○ (22) | 6 | ⊙ | ○— | ⊙ | ⊙ | ○ | ⊙ | ○ |
| | 5 | ○+ (20) | 7 | ○ | ○— | ⊙ | ⊙ | ○ | ⊙ | ○ |
| | 6 | ○— (28) | 33 | ⊙ | ○— | ⊙ | ⊙ | ○ | ⊙ | ○ |
| | 7 | ○— (26) | 30 | ⊙ | ○— | ⊙ | ⊙ | ○ | ⊙ | ○ |
| | 8 | ○ (25) | 33 | ⊙ | ○— | ⊙ | ⊙ | ○ | ⊙ | ○ |
| | 9 | ○— (29) | 17 | ⊙ | ○— | ⊙ | ○ | Δ | ⊙ | ○ |
| | 10 | ○ (21) | 16 | ⊙ | ○— | ⊙ | ⊙ | ○ | ⊙ | ○ |
| | 11 | ○+ (20) | 17 | ⊙ | ○— | ⊙ | ⊙ | ○ | ⊙ | ○ |
| | 12 | ○— (30) | 17 | ⊙ | ○— | ⊙ | ○ | Δ | ⊙ | ○ |
| | 13 | ○+ (19) | 13 | ⊙ | ○— | ⊙ | ⊙ | ○ | ⊙ | ○ |

TABLE 11

<EXAMPLE 1>

| No. | | Blackness (L value) | Specular gloss | Weldability | Formability | Adhesion | Corrosion resistance Flat portion | Corrosion resistance Formed portion | Light fastness | Resistance to staining by finger-prints |
|---|---|---|---|---|---|---|---|---|---|---|
| Sample of the invention | 14 | ⊙ (15) | 36 | ⊙ | ○— | ⊙ | ⊙ | ○ | ⊙ | ○ |
| | 15 | ○+ (17) | 20 | ⊙ | ○— | ⊙ | ⊙ | ○ | ⊙ | ○ |
| | 16 | ○— (27) | 5 | ⊙ | ○— | ⊙ | ⊙ | ○ | ⊙ | ○ |
| | 17 | ○ (25) | 5 | ⊙ | ○— | ⊙ | ⊙ | ○ | ⊙ | ○+ |
| | 18 | ○ (25) | 13 | ⊙ | ○— | ⊙ | ⊙ | ○ | ⊙ | ○ |
| | 19 | ○ (25) | 5 | ⊙ | ○— | ⊙ | ⊙ | ○ | ⊙ | ○+ |
| | 20 | ○ (25) | 11 | ⊙ | ○— | ⊙ | ⊙ | ○ | ⊙ | ○ |
| | 21 | ○— (27) | 6 | ⊙ | ○— | ⊙ | ⊙ | ○ | ⊙ | ○ |
| | 22 | ○ (25) | 4 | ⊙ | ○— | ⊙ | ⊙ | ○ | ⊙ | ○ |
| | 23 | ○ (25) | 4 | ⊙ | ○— | ⊙ | ⊙ | ○ | ○ | ○ |
| | 24 | ○ (25) | 4 | ⊙ | ○— | ⊙ | ⊙ | ○ | ○ | ○ |

TABLE 12

<EXAMPLE 1>

| No. | | Blackness (L value) | Specular gloss | Weld-ability | Form-ability | Adhesion | Corrosion resistance Flat portion | Corrosion resistance Formed portion | Light fast-ness | Resistance to staining by finger-prints | Remarks |
|---|---|---|---|---|---|---|---|---|---|---|---|
| Comparative Sample | 1 | X (31) | 2 | ⊙ | ○— | ⊙ | X | X | ⊙ | X | Liable to damage |
| | 2 | X (40) | 3 | ⊙ | ○— | ⊙ | X | X | ⊙ | X | |
| | 3 | X (40) | 6 | — | — | — | — | — | — | — | |
| | 4 | — | — | — | — | — | — | — | — | — | The sedimentation of additive 1 in the paint disabled its application. |
| | 5 | ⊙ (13) | 34 | — | — | — | — | — | — | — | Unsatisfactory matting |
| | 6 | — | — | — | — | — | — | — | — | — | The sedimentation of additive 2 in the paint disabled its application. |
| | 7 | ○ (23) | 10 | X | — | — | — | — | — | — | |
| | 8 | ⊙ (13) | 40 | ⊙ | ○— | ⊙ | ⊙ | ○ | ⊙ | X | |

TABLE 13

<EXAMPLE 2>

| No. | | Starting sheet Material *1 | Starting sheet Coating weight (g/m²) | Chromate film Material | Chromate film Coating weight of chromium (mg/m²) | Black film Base Resin *2 | Black film Additive 1 Material *3 | Black film Additive 1 Proportion (parts) *4 |
|---|---|---|---|---|---|---|---|---|
| Sample of the invention | 1 | 1 | 20 | coating | 50 | 1 | 1 | 80 |
| | 2 | " | " | " | " | " | " | " |
| | 3 | " | " | " | " | " | " | " |
| | 4 | " | " | " | " | " | " | " |
| | 5 | " | " | " | " | " | " | " |
| | 6 | " | " | " | " | " | " | " |
| | 7 | " | " | " | " | " | " | " |
| | 8 | " | " | " | " | " | " | " |
| | 9 | " | " | " | " | " | " | " |
| | 10 | " | " | " | " | " | " | " |
| | 11 | " | " | " | " | " | " | " |
| | 12 | " | " | " | " | " | " | " |
| | 13 | " | " | " | " | " | " | " |

| No. | | Black film Additive 2 Material *5 | Black film Additive 2 Proportion (parts) *6 | Black film Additive 3 Material *7 | Black film Additive 3 Proportion (parts) *8 | Black film Additive 4 Material *9 | Black film Additive 4 Proportion (parts) *10 | Baking temp. (°C.) | Thick-ness (μ) |
|---|---|---|---|---|---|---|---|---|---|
| Sample of the invention | 1 | 4 | 60 | 1 | 10 | — | — | 210 | 1.5 |
| | 2 | " | " | 2 | " | — | — | " | " |
| | 3 | " | " | 3 | " | — | — | " | " |
| | 4 | " | " | 4 | " | — | — | " | " |
| | 5 | " | " | 5 | " | — | — | " | " |
| | 6 | " | " | 1 | 1 | — | — | " | " |
| | 7 | " | " | " | 20 | — | — | " | " |
| | 8 | " | " | " | 60 | — | — | " | " |

TABLE 13-continued

| | | | | | | | | |
|---|---|---|---|---|---|---|---|---|
| 9 | " | " | — | — | 1 | 10 | " | " |
| 10 | " | " | — | — | 2 | " | " | " |
| 11 | " | " | — | — | 3 | " | " | " |
| 12 | " | " | — | — | 1 | 1 | " | " |
| 13 | " | " | — | — | " | 30 | " | " |

TABLE 14

<EXAMPLE 2>

| | | Starting sheet | | Chromate film | | Black film Additive 1 | | |
|---|---|---|---|---|---|---|---|---|
| No. | | Material *1 | Coating weight (g/m²) | Material | Coating weight of chromium (mg/m²) | Base Resin *2 | Material *3 | Proportion (parts) *4 |
| Sample of the invention | 14 | 1 | 20 | coating | 50 | 1 | 1 | 80 |
| | 15 | " | " | " | " | " | " | " |
| | 16 | " | " | " | " | " | " | " |
| | 17 | " | " | " | " | " | " | " |
| | 18 | " | " | " | " | " | " | " |
| | 19 | " | " | " | " | " | " | " |
| | 20 | " | " | " | " | " | " | " |
| | 21 | " | " | " | " | " | " | " |
| | 22 | " | " | " | " | " | " | " |
| | 23 | " | " | " | " | " | " | " |
| Comparative Sample | 1 | " | 20 | coating | 50 | 1 | 1 | 80 |
| | 2 | " | " | " | " | " | " | " |

| | | Black film | | | | | | Baking temp. (°C.) | Thickness (μ) |
|---|---|---|---|---|---|---|---|---|---|
| | | Additive 2 | | Additive 3 | | Additive 4 | | | |
| No. | | Material *5 | Proportion (parts) *6 | Material *7 | Proportion (parts) *8 | Material *9 | Proportion (parts) *10 | | |
| Sample of the invention | 14 | 4 | 60 | — | — | 1 | 60 | 210 | 1.5 |
| | 15 | " | " | — | — | " | 100 | " | " |
| | 16 | " | " | 1 | 10 | " | 1 | " | " |
| | 17 | " | " | " | " | " | 10 | " | " |
| | 18 | " | " | " | " | " | 30 | " | " |
| | 19 | " | " | " | " | " | 60 | " | " |
| | 20 | " | " | " | 30 | " | 30 | " | " |
| | 21 | " | " | " | 10 | 2 | 20 | " | " |
| | 22 | " | " | 2 | " | 3 | " | " | " |
| | 23 | " | " | 5 | " | " | " | " | " |
| Comparative Sample | 1 | 1 | 60 | 1 | 150 | — | — | 210 | 1.5 |
| | 2 | " | " | — | — | 1 | 150 | " | " |

TABLE 15

<EXAMPLE 2>

| No. | | Blackness (L value) | Specular gloss | Weldability | Formability | Adhesion | Corrosion resistance Flat portion | Corrosion resistance Formed portion | Light fastness | Resistance to staining by fingerprints |
|---|---|---|---|---|---|---|---|---|---|---|
| Sample of the invention | 1 | ∘ (24) | 3 | ⊚ | ∘— | ⊚ | ⊚ | ⊚ | ⊚ | ∘+ |
| | 2 | ∘ (24) | 3 | ⊚ | ∘— | ⊚ | ⊚ | ⊚ | ⊚ | ∘+ |
| | 3 | ∘ (25) | 3 | ⊚ | ∘— | ⊚ | ⊚ | ⊚ | ⊚ | ∘+ |
| | 4 | ∘ (25) | 3 | ⊚ | ∘— | ⊚ | ⊚ | ⊚ | ⊚ | ∘+ |
| | 5 | ∘ (21) | 3 | ⊚ | ∘— | ⊚ | ⊚ | ∘+ | ⊚ | ∘+ |
| | 6 | ∘ (23) | 4 | ⊚ | ∘— | ⊚ | ⊚ | ∘+ | ⊚ | ∘+ |
| | 7 | ∘— (27) | 2 | ⊚ | ∘— | ⊚ | ⊚ | ⊚ | ⊚ | ∘+ |
| | 8 | ∘— (29) | 1 | ⊚ | ∘— | ⊚ | ⊚ | ⊚ | ⊚ | ∘+ |
| | 9 | ∘ (23) | 4 | ⊚ | ⊚ | ⊚ | ⊚ | ∘ | ⊚ | ∘+ |
| | 10 | ∘ (21) | 4 | ⊚ | ⊚ | ⊚ | ⊚ | ∘ | ⊚ | ∘+ |
| | 11 | ∘ (22) | 4 | ⊚ | ⊚ | ⊚ | ⊚ | ∘ | ⊚ | ∘+ |
| | 12 | ∘ (20) | 5 | ⊚ | ∘ | ⊚ | ⊚ | ∘ | ⊚ | ∘+ |
| | 13 | ∘ (25) | 4 | ⊚ | ⊚ | ⊚ | ⊚ | ∘ | ⊚ | ∘+ |

TABLE 16
<EXAMPLE 2>

| No. | | Blackness (L value) | Specular gloss | Weld-ability | Form-ability | Adhesion | Corrosion resistance Flat portion | Corrosion resistance Formed portion | Light fastness | Resistance to staining by finger-prints | Remarks |
|---|---|---|---|---|---|---|---|---|---|---|---|
| Sample of the invention | 14 | ○— (27) | 3 | ⊙ | ⊙ | ⊙ | ⊙ | ○ | ⊙ | ○+ | |
| | 15 | ○— (28) | 3 | ⊙ | ⊙ | ⊙ | ⊙ | ○ | ⊙ | ○+ | |
| | 16 | ○ (24) | 2 | ⊙ | ○ | ⊙ | ⊙ | ⊙ | ⊙ | ⊙ | |
| | 17 | ○ (25) | 2 | ⊙ | ⊙ | ⊙ | ⊙ | ⊙ | ⊙ | ⊙ | |
| | 18 | ○ (25) | 2 | ⊙ | ⊙ | ⊙ | ⊙ | ⊙ | ⊙ | ⊙ | |
| | 19 | ○— (27) | 1 | ⊙ | ⊙ | ⊙ | ⊙ | ⊙ | ⊙ | ⊙ | |
| | 20 | ○— (29) | 1 | ⊙ | ⊙ | ⊙ | ⊙ | ⊙ | ⊙ | ⊙ | |
| | 21 | ○ (25) | 2 | ⊙ | ⊙ | ⊙ | ⊙ | ⊙ | ⊙ | ⊙ | |
| | 22 | ○ (24) | 2 | ⊙ | ⊙ | ⊙ | ⊙ | ⊙ | ⊙ | ⊙ | |
| | 23 | ○ (25) | 2 | ⊙ | ⊙ | ⊙ | ⊙ | ⊙ | ⊙ | ⊙ | |
| Comparative sample | 1 | X (33) | 3 | — | — | — | — | — | — | — | Liable to damage |
| | 2 | X (31) | 5 | — | — | — | — | — | — | — | Liable to damage |

TABLE 17
<EXAMPLE 3>

| | | Starting sheet | | Chromate film | | | Black film Additive 1 | | |
|---|---|---|---|---|---|---|---|---|---|
| No. | | Material *1 | Coating weight (g/m²) | Material | Coating weight of chromium (mg/m²) | Base Resin *2 | Material *3 | Proportion (parts) *4 | |
| Sample of the invention | 1 | 1 | 20 | coating | 50 | 2 | 1 | 80 | |
| | 2 | " | " | " | " | 3 | 2 | " | |
| | 3 | " | " | Electrolysis | 30 | 1 | 1 | " | |
| | 4 | 2 | 30 | coating | 50 | " | " | " | |
| | 5 | 3 | 20 | " | " | " | " | " | |
| | 6 | 4 | 90 | " | " | " | " | " | |
| | 7 | 5 | 30 | " | " | " | " | " | |
| | 8 | 1 | 20 | " | " | " | " | " | |
| | 9 | " | " | " | " | " | " | " | |
| | 10 | " | " | " | " | " | " | " | |
| | 11 | " | " | " | 200 | " | " | " | |
| | 12 | " | " | " | 1 | " | " | " | |
| Comparative sample | 1 | 1 | 20 | coating | 50 | 4 | 1 | 80 | |

| | | Black film Additive 2 | | Additive 3 | | Additive 4 | | | |
|---|---|---|---|---|---|---|---|---|---|
| No. | | Material *5 | Proportion (parts) *6 | Material *7 | Proportion (parts) *8 | Material *9 | Proportion (parts) *10 | Baking temp. (°C.) | Thickness (μ) |
| Sample of the invention | 1 | 1 | 60 | — | — | — | — | 210 | 1.5 |
| | 2 | 2 | " | — | — | — | — | " | " |
| | 3 | 1 | " | — | — | — | — | " | " |
| | 4 | " | " | — | — | — | — | " | " |
| | 5 | " | " | — | — | — | — | " | " |
| | 6 | " | " | — | — | — | — | " | " |
| | 7 | " | " | — | — | — | — | " | " |
| | 8 | " | " | — | — | — | — | 80 | " |
| | 9 | " | " | — | — | — | — | 140 | " |
| | 10 | " | " | — | — | — | — | 250 | " |
| | 11 | " | " | — | — | — | — | 210 | " |
| | 12 | " | " | — | — | — | — | " | " |
| Comparative sample | 1 | 1 | 50 | 1 | 50 | — | — | 210 | 1.5 |

TABLE 18
<EXAMPLE 3>

| No. | | Blackness (L value) | Specular gloss | Weld-ability | Form-ability | Adhesion | Corrosion resistance Flat portion | Corrosion resistance Formed portion | Light fastness | Resistance to staining by finger-prints | Remarks |
|---|---|---|---|---|---|---|---|---|---|---|---|
| Sample of the | 1 | ○ (25) | 5 | ⊙ | ○— | ⊙ | ⊙ | ○ | ⊙ | ○ | |
| | 2 | ○ (25) | 5 | ⊙ | ○— | ⊙ | ⊙ | ○ | ⊙ | ○+ | |

TABLE 18-continued
<EXAMPLE 3>

| No. | | Blackness (L value) | Specular gloss | Weld-ability | Form-ability | Adhesion | Corrosion resistance Flat portion | Corrosion resistance Formed portion | Light fast-ness | Resistance to staining by finger-prints | Remarks |
|---|---|---|---|---|---|---|---|---|---|---|---|
| invention | 3 | ○ (25) | 5 | ⊚ | ○− | ⊚ | ⊚ | ○ | ⊚ | ○ | |
| | 4 | ○ (25) | 5 | ⊚ | ○− | ⊚ | ⊚ | ○+ | ⊚ | ○ | |
| | 5 | ○ (25) | 5 | ⊚ | ○− | ⊚ | ⊚ | ○+ | ⊚ | ○ | |
| | 6 | ○ (25) | 5 | ⊚ | ○− | ⊚ | ⊚ | ○+ | ⊚ | ○ | |
| | 7 | ○ (25) | 5 | ⊚ | ○− | ⊚ | ⊚ | ○+ | ⊚ | ○ | |
| | 8 | ○ (23) | 10 | ⊚ | ○− | ⊚ | ⊚ | ○ | ⊚ | ○ | |
| | 9 | ○ (25) | 7 | ⊚ | ○− | ⊚ | ⊚ | ○ | ⊚ | ○ | |
| | 10 | ○ (25) | 5 | ⊚ | ○− | ⊚ | ○+ | Δ | ⊚ | ○ | |
| | 11 | ○ (25) | 5 | ⊚ | ○− | ⊚ | ⊚ | ○+ | ⊚ | ○ | |
| | 12 | ○ (25) | 5 | ⊚ | ○− | ⊚ | ○− | Δ | ⊚ | ○ | |
| Comparative sample | 1 | ○ (25) | 3 | — | — | — | — | — | — | — | Liable to damage |

TABLE 19

| No. | Additive 2 (Organic Resin Particles) | Tradename | Shape | Average particle diameter | Color |
|---|---|---|---|---|---|
| 1 | Condensation product of benzoguanamine and formaldehyde | EPOCOLOR BP-1004 (Nippon Shokubai K.K.) | Spherical | 4 μm | Black |
| 2 | Condensation product of benzoguanamine and formaldehyde | EPOCOLOR BP-1008 (Nippon Shokubai K.K.) | Spherical | 8 μm | Black |
| 3 | Condensation product of benzoguanamine and formaldehyde | EPOCOLOR BP-1015 (Nippon Shokubai K.K.) | Spherical | 15 μm | Black |
| 4 | Condensation product of benzoguanamine, melamine and formaldehyde | EPOSTAR M30 (Nippon Shokubai K.K.) | Spherical | 3 μm | White |
| 5 | Condensation product of benzoguanamine and formaldehyde | EPOSTAR L15 (Nippon Shokubai K.K.) | Spherical | 15 μm | White |
| 6 | Polyacrylonitrile | TAFTICK N-23 (TOYOBO Co., Ltd.) | Spherical | 1~2 μm | White |
| 7 | Polyacrylonitrile | TAFTICK AM (TOYOBO Co., Ltd.) | Spherical | 7~10 μm | White |
| 8 | Acrylic resin | TAFTICK AR-650S (TOYOBO Co., Ltd.) | Spherical | 10 μm | Transparent |
| 9 | Thermoplastic nylon | ORUGASOL 2002, ES-5 (Nippon Lylsan Co., Ltd.) | Spherical | 48~52 μm | White |
| 10 | Condensation product of melamine and formaldehyde | EPOSTAR S (Nippon Shokubai K.K.) | Spherical | 0.3 μm | White |

TABLE 20

| No. | Additive 3 | Tradename |
|---|---|---|
| 1 | Silica of a gel type, obtained by the reaction of sodium silicate and mineral acids | CYROID 404 (Fuji-Davision Chemical Co., Ltd.) |
| 2 | Silica of a precipitated type, obtained by the reaction of sodium silicate and mineral acids | MIZUKASIL P-526 (Mizusawa Chemical Industrial Co., Ltd.) |
| 3 | Titanium oxide | — |
| 4 | Fumed silica | — |

TABLE 21

| No. | Additive 4 | Tradename |
|---|---|---|
| 1 | Polytetrafluoroethylene resin | SST-IMG (Shamrock) |
| 2 | Polytetrafluoroethylene resin | LUBURON L-5 (Daikin Industrial Co., Ltd.) |

TABLE 22

| No. | Additive 5 (Solid Lubricant) | Tradename (Manufacturer) |
|---|---|---|
| 1 | Polyethylene wax | SANWAX 151-P (Sanyo Chemical Co., Ltd.) |
| 2 | Paraffin wax | (Japan Wax Refining Co., Ltd.) |

TABLE 23

| No. | Additive 6 (Rust-Inhibitive Pigment) | Name or Tradename |
|---|---|---|
| 1 | Chromic acid salt | Barium chromate (Kikuchi Color Industrial Co., Ltd.) |
| 2 | fumed silica | R811 (Nippon Aerozile Co., Ltd.) |

TABLE 24
<EXAMPLE 4>

| Starting sheet | Chromate film | | Black film | | | |
|---|---|---|---|---|---|---|
| | | | | Additive 1 | | Additive 2 |
| Coating | Coating weight | Base | Material | Proportion | Material | Proportion |

TABLE 24-continued

| No. | | Material *11 | weight (g/m²) | Material | of chromium (mg/m²) | Resin *12 | rial *13 | (parts) *14 | rial *15 | (parts) *16 |
|---|---|---|---|---|---|---|---|---|---|---|
| Sample | 1 | 1 | 20 | coating | 50 | 1 | 1 | 80 | 2 | 40 |
| of the | 2 | " | " | " | " | " | " | " | " | " |
| invention | 3 | " | " | " | " | " | " | " | " | 50 |
| | 4 | " | " | " | " | " | " | " | " | " |
| | 5 | " | " | " | " | " | " | " | " | " |
| | 6 | " | " | " | " | " | 2 | " | " | 100 |
| | 7 | " | " | " | " | " | 3 | " | " | " |
| | 8 | " | " | " | " | " | 4 | " | " | " |
| | 9 | " | " | " | " | " | 7 | " | " | " |
| | 10 | " | " | " | " | " | 1 | 5 | " | 20 |
| | 11 | " | " | " | " | " | " | 10 | " | " |
| | 12 | " | " | " | " | " | " | 120 | " | 100 |
| | 13 | " | " | " | " | " | " | 200 | " | " |
| | 14 | " | " | " | " | " | " | 80 | " | 150 |

| | | Black film | | | | | | | | | |
|---|---|---|---|---|---|---|---|---|---|---|---|
| | | Additive 3 | | Additive 4 | | Additive 5 | | Additive 6 | | | |
| No. | | Material *17 | Proportion (parts) *18 | Material *19 | Proportion (parts) *20 | Material *21 | Proportion (parts) *22 | Material *23 | Proportion (parts) *24 | Baking temp. (°C.) | Thickness (μ) |
| Sample | 1 | — | — | — | — | — | — | — | — | 210 | 0.3 |
| of the | 2 | — | — | — | — | — | — | — | — | " | 0.8 |
| invention | 3 | — | — | — | — | — | — | — | — | " | 1.5 |
| | 4 | — | — | — | — | — | — | — | — | " | 3.0 |
| | 5 | — | — | — | — | — | — | — | — | " | 5.0 |
| | 6 | — | — | — | — | — | — | — | — | " | 1.5 |
| | 7 | — | — | — | — | — | — | — | — | " | " |
| | 8 | — | — | — | — | — | — | — | — | " | " |
| | 9 | — | — | — | — | — | — | — | — | " | " |
| | 10 | — | — | — | — | — | — | — | — | " | 3.0 |
| | 11 | — | — | — | — | — | — | — | — | " | " |
| | 12 | — | — | — | — | — | — | — | — | " | 1.5 |
| | 13 | — | — | — | — | — | — | — | — | " | " |
| | 14 | — | — | — | — | — | — | — | — | " | " |

TABLE 25

<EXAMPLE 4>

| | | Starting sheet | | Chromate film | | | Black film | | | |
|---|---|---|---|---|---|---|---|---|---|---|
| | | | | | | | Additive 1 | | Additive 2 | |
| No. | | Material *11 | Coating weight (g/m²) | Material | Coating weight of chromium (mg/m²) | Base Resin *12 | Material *13 | Proportion (parts) *14 | Material *15 | Proportion (parts) *16 |
| Sample | 15 | 1 | 20 | coating | 50 | 1 | 1 | 80 | 1 | 100 |
| of the | 16 | " | " | " | " | " | " | " | 3 | " |
| invention | 17 | " | " | " | " | " | " | " | 4 | 60 |
| | 18 | " | " | " | " | " | " | " | 5 | " |
| | 19 | " | " | " | " | " | " | " | 6 | " |
| | 20 | " | " | " | " | " | " | " | 7 | " |
| | 21 | " | " | " | " | " | " | " | 8 | " |

| | | Black film | | | | | | | | | |
|---|---|---|---|---|---|---|---|---|---|---|---|
| | | Additive 3 | | Additive 4 | | Additive 5 | | Additive 6 | | | |
| No. | | Material *17 | Proportion (parts) *18 | Material *19 | Proportion (parts) *20 | Material *21 | Proportion (parts) *22 | Material *23 | Proportion (parts) *24 | Baking temp. (°C.) | Thickness (μ) |
| Sample | 15 | — | — | — | — | — | — | — | — | 210 | 1.5 |
| of the | 16 | — | — | — | — | — | — | — | — | " | " |
| invention | 17 | — | — | — | — | — | — | — | — | " | " |
| | 18 | — | — | — | — | — | — | — | — | " | " |
| | 19 | — | — | — | — | — | — | — | — | " | " |
| | 20 | — | — | — | — | — | — | — | — | " | " |
| | 21 | — | — | — | — | — | — | — | — | " | " |

TABLE 26

<EXAMPLE 4>

| Starting sheet | Chromate film | | Black film | |
|---|---|---|---|---|
| | | | Additive 1 | Additive 2 |
| Coating | Coating weight | Base | Material Proportion | Material Proportion |

TABLE 26-continued

| No. | | Material *11 | weight (g/m²) | Material | of chromium (mg/m²) | Resin *12 | rial *13 | (parts) *14 | rial *15 | (parts) *16 |
|---|---|---|---|---|---|---|---|---|---|---|
| Compar- | 1 | 1 | 20 | coating | 50 | 1 | 1 | 80 | 9 | 60 |
| ative | 2 | " | " | " | " | " | " | " | 10 | " |
| sample | 3 | " | " | " | " | " | " | " | 1 | 1 |
| | 4 | " | " | " | " | " | " | " | 3 | 200 |
| | 5 | " | " | " | " | " | " | 0.5 | 1 | 60 |
| | 6 | " | " | " | " | " | " | 300 | " | " |
| | 7 | " | " | " | " | " | " | 80 | " | " |

| | | Black film | | | | | | | | |
|---|---|---|---|---|---|---|---|---|---|---|
| | | Additive 3 | | Additive 4 | | Additive 5 | | Additive 6 | | |
| No. | | Material *17 | Proportion (parts) *18 | Material *19 | Proportion (parts) *20 | Material *21 | Proportion (parts) *22 | Material *23 | Proportion (parts) *24 | Baking temp. (°C.) | Thickness (μ) |
| Compar- | 1 | — | — | — | — | — | — | — | — | 210 | 1.5 |
| ative | 2 | — | — | — | — | — | — | — | — | " | " |
| sample | 3 | — | — | — | — | — | — | — | — | " | " |
| | 4 | — | — | — | — | — | — | — | — | " | " |
| | 5 | — | — | — | — | — | — | — | — | " | " |
| | 6 | — | — | — | — | — | — | — | — | " | " |
| | 7 | — | — | — | — | — | — | — | — | " | 10.0 |

TABLE 27

<EXAMPLE 4>

| No. | | Blackness (L value) | | Specular gloss | Resistance to staining by fingerprints | Weldability | Formability | Adhesion | Corrosion resistance Flat portion | Corrosion resistance Formed portion | Light fastness |
|---|---|---|---|---|---|---|---|---|---|---|---|
| Sample of | 1 | ○— | (30) | 7 | ○— | ⊚ | ○— | ⊚ | ○ | △ | ⊚ |
| the | 2 | ○— | (28) | 5 | ○+ | ⊚ | ○— | ⊚ | ⊚ | ○ | ⊚ |
| invention | 3 | ○ | (24) | 5 | ○+ | ⊚ | ○— | ⊚ | ⊚ | ○ | ⊚ |
| | 4 | ○ | (23) | 7 | ○+ | ⊚ | ○— | ⊚ | ⊚ | ○ | ⊚ |
| | 5 | ○ | (22) | 9 | ○+ | ○ | ○— | ⊚ | ⊚ | ○ | ⊚ |
| | 6 | ○— | (27) | 3 | ○+ | ⊚ | ○— | ⊚ | ⊚ | ○ | ⊚ |
| | 7 | ○— | (27) | 3 | ○+ | ⊚ | ○— | ⊚ | ⊚ | ○ | ⊚ |
| | 8 | ○— | (27) | 3 | ○+ | ⊚ | ○— | ⊚ | ⊚ | ○ | ⊚ |
| | 9 | ○— | (27) | 3 | ○+ | ⊚ | ○— | ⊚ | ⊚ | ○ | ⊚ |
| | 10 | ○— | (29) | 6 | ○+ | ⊚ | ○— | ⊚ | ⊚ | ○ | ⊚ |
| | 11 | ○— | (28) | 6 | ○+ | ⊚ | ○— | ⊚ | ⊚ | ○ | ⊚ |
| | 12 | ○ | (25) | 3 | ○+ | ⊚ | ○— | ⊚ | ⊚ | ○ | ⊚ |
| | 13 | ○ | (24) | 3 | ○+ | ⊚ | ○— | ⊚ | ⊚ | ○ | ⊚ |
| | 14 | ○— | (29) | 2 | ○+ | ⊚ | ○— | ⊚ | ⊚ | ○ | ⊚ |

TABLE 28

<EXAMPLE 4>

| No. | | Blackness (L value) | | Specular gloss | Resistance to staining by fingerprints | Weldability | Formability | Adhesion | Corrosion resistance Flat portion | Corrosion resistance Formed portion | Light fastness |
|---|---|---|---|---|---|---|---|---|---|---|---|
| Sample | 15 | ○— | (26) | 2 | ○+ | ⊚ | ○— | ⊚ | ⊚ | ○ | ⊚ |
| of the | 16 | ○— | (28) | 4 | ○+ | ⊚ | ○— | ⊚ | ⊚ | ○ | ⊚ |
| invention | 17 | ○— | (26) | 4 | ○ | ⊚ | ○— | ⊚ | ⊚ | ○ | ⊚ |
| | 18 | ○— | (27) | 5 | ○+ | ⊚ | ○— | ⊚ | ⊚ | ○ | ⊚ |
| | 19 | ○+ | (18) | 14 | △ | ⊚ | ○— | ⊚ | ⊚ | ○ | ⊚ |
| | 20 | ○ | (25) | 6 | ○+ | ⊚ | ○— | ⊚ | ⊚ | ○ | ⊚ |
| | 21 | ○— | (26) | 8 | ○+ | ⊚ | ○— | ⊚ | ⊚ | ○ | ⊚ |

TABLE 29

<EXAMPLE 4>

| No. | | Blackness (L value) | | Specular gloss | Resistance to staining by fingerprints | Weldability | Formability | Adhesion | Corrosion resistance Flat portion | Corrosion resistance Formed portion | Light fastness |
|---|---|---|---|---|---|---|---|---|---|---|---|
| Compar- | 1 | X | (35) | 21 | ○+ | — | — | — | — | — | — |
| ative | 2 | ○ | (22) | 20 | X | — | — | — | — | — | — |
| sample | 3 | ○+ | (16) | 33 | X | — | — | — | — | — | — |
| | 4 | The sedimentation of additive 2 in the paint disabled its application. | | | | | | | | | |
| | 5 | X | (40) | 6 | — | — | — | — | — | — | — |
| | 6 | The sedimentation of additive 1 in the paint disabled its application. | | | | | | | | | |

TABLE 29-continued

<EXAMPLE 4>

| No. | Blackness (L value) | Specular gloss | Resistance to staining by finger-prints | Weldability | Formability | Adhesion | Corrosion resistance Flat portion | Corrosion resistance Formed portion | Light fastness |
|---|---|---|---|---|---|---|---|---|---|
| 7 | ○ | (21) | 10 | ○ | X | — | — | — | — | — |

TABLE 30

<EXAMPLE 5>

| | | Starting sheet | | Chromate film | | | Black film Base Resin *12 | Black film Additive 1 | | Black film Additive 2 | |
|---|---|---|---|---|---|---|---|---|---|---|---|
| No. | | Material *11 | Coating weight (g/m²) | Material | Coating weight of chromium (mg/m²) | | | Material *13 | Proportion (parts) *14 | Material *15 | Proportion (parts) *16 |
| Sample of the invention | 1 | 1 | 20 | coating | 50 | | 1 | 1 | 80 | 2 | 100 |
| | 2 | " | " | " | " | | " | " | " | " | " |
| | 3 | " | " | " | " | | " | " | " | " | " |
| | 4 | " | " | " | " | | " | " | " | " | " |
| | 5 | " | " | " | " | | " | " | " | " | " |
| | 6 | " | " | " | " | | " | " | " | " | " |
| | 7 | " | " | " | " | | " | " | " | " | " |
| | 8 | " | " | " | " | | " | " | " | " | " |
| | 9 | " | " | " | " | | " | " | " | " | " |
| | 10 | " | " | " | " | | " | " | " | " | " |
| | 11 | " | " | " | " | | " | " | " | " | " |

| | | Black film Additive 3 | | Additive 4 | | Additive 5 | | Additive 6 | | | |
|---|---|---|---|---|---|---|---|---|---|---|---|
| No. | | Material *17 | Proportion (parts) *18 | Material *19 | Proportion (parts) *20 | Material *21 | Proportion (parts) *22 | Material *23 | Proportion (parts) *24 | Baking temp. (°C.) | Thickness (μ) |
| Sample of the invention | 1 | 1 | 10 | — | — | — | — | — | — | 210 | 1.5 |
| | 2 | — | — | 1 | 20 | — | — | — | — | " | " |
| | 3 | 1 | 10 | " | " | — | — | — | — | " | " |
| | 4 | " | 1 | " | " | — | — | — | — | " | " |
| | 5 | " | 5 | " | " | — | — | — | — | " | " |
| | 6 | " | 30 | " | " | — | — | — | — | " | " |
| | 7 | " | 10 | " | 1 | — | — | — | — | " | " |
| | 8 | " | " | " | 30 | — | — | — | — | " | " |
| | 9 | " | " | " | 40 | — | — | — | — | " | " |
| | 10 | 2 | " | " | 20 | — | — | — | — | " | " |
| | 11 | " | " | 2 | " | — | — | — | — | " | " |

TABLE 31

<EXAMPLE 5>

| | | Starting sheet | | Chromate film | | Base Resin *12 | Black film Additive 1 | | Black film Additive 2 | |
|---|---|---|---|---|---|---|---|---|---|---|
| No. | | Material *11 | Coating weight (g/m²) | Material | Coating weight of chromium (mg/m²) | | Material *13 | Proportion (parts) *14 | Material *15 | Proportion (parts) *16 |
| Comparative sample | 1 | 1 | 20 | coating | 50 | 1 | 1 | 80 | 2 | 100 |
| | 2 | " | " | " | " | " | " | " | " | " |
| | 3 | " | " | " | " | " | " | " | " | " |
| | 4 | " | " | " | " | " | " | " | " | " |

| | | Black film Additive 3 | | Additive 4 | | Additive 5 | | Additive 6 | | | |
|---|---|---|---|---|---|---|---|---|---|---|---|
| No. | | Material *17 | Proportion (parts) *18 | Material *19 | Proportion (parts) *20 | Material *21 | Proportion (parts) *22 | Material *23 | Proportion (parts) *24 | Baking temp. (°C.) | Thickness (μ) |
| Comparative sample | 1 | 3 | 10 | — | — | — | — | — | — | 210 | 1.5 |
| | 2 | 4 | " | — | — | — | — | — | — | " | " |
| | 3 | 1 | 50 | — | — | — | — | — | — | " | " |
| | 4 | — | — | 1 | 50 | — | — | — | — | " | " |

TABLE 32

<EXAMPLE 5>

| No. | | Blackness (L value) | Specular gloss | Resistance to staining by finger-prints | Weldability | Formability | Adhesion | Corrosion resistance Flat portion | Corrosion resistance Formed portion | Light fastness |
|---|---|---|---|---|---|---|---|---|---|---|
| Sample of the invention | 1 | ○ (25) | 1 | ○+ | ◎ | ○— | ◎ | ◎ | ○ | ◎ |
| | 2 | ○— (27) | 2 | ○+ | ◎ | ○ | ◎ | ◎ | ◎ | ◎ |
| | 3 | ○ (23) | 0.6 | ◎ | ◎ | ○ | ◎ | ◎ | ◎ | ◎ |
| | 4 | ○— (26) | 2.5 | ◎ | ◎ | ○ | ◎ | ◎ | ◎ | ◎ |
| | 5 | ○ (25) | 1.0 | ◎ | ◎ | ○ | ◎ | ◎ | ◎ | ◎ |
| | 6 | ○+ (26) | 0.4 | ◎ | ◎ | ○ | ◎ | ◎ | ◎ | ◎ |
| | 7 | ○ (25) | 0.8 | ◎ | ◎ | ○— | ◎ | ◎ | ◎ | ◎ |
| | 8 | ○ (22) | 0.5 | ◎ | ◎ | ○ | ◎ | ◎ | ◎ | ◎ |
| | 9 | ○— (29) | 0.4 | ◎ | ◎ | ○ | ◎ | ◎ | ◎ | ◎ |
| | 10 | ○ (23) | 0.6 | ◎ | ◎ | ○ | ◎ | ◎ | ◎ | ◎ |
| | 11 | ○ (23) | 0.6 | ◎ | ◎ | ○ | ◎ | ◎ | ◎ | ◎ |

TABLE 33

<EXAMPLE 5>

| No. | | Blackness (L value) | Specular gloss | Resistance to staining by finger-prints | Weldability | Formability | Adhesion | Corrosion resistance Flat portion | Corrosion resistance Formed portion | Light fastness |
|---|---|---|---|---|---|---|---|---|---|---|
| Comparative sample | 1 | — (28) | 2 | + | No greatly improved resistance to staining by fingerprints was achieved by additive 3. | | | | | |
| | 2 | — (29) | 1 | + | No greatly improved resistance to staining by fingerprints was achieved by additive 3. | | | | | |
| | 3 | | | | The sedimentation of additive 3 in the paint disabled its application. | | | | | |
| | 4 | | | | The sedimentation of additive 4 in the paint disabled its application. | | | | | |

TABLE 34

<EXAMPLE 6>

| No. | | Starting sheet Material *11 | Starting sheet Coating weight (g/m²) | Chromate film Material | Chromate film Coating weight of chromium (mg/m²) | Black film Base Resin *12 | Black film Additive 1 Material *13 | Black film Additive 1 Proportion (parts) *14 | Black film Additive 2 Material *15 | Black film Additive 2 Proportion (parts) *16 |
|---|---|---|---|---|---|---|---|---|---|---|
| Sample of the invention | 1 | 1 | 20 | coating | 50 | 1 | 1 | 80 | 2 | 100 |
| | 2 | " | " | " | " | " | " | " | " | " |
| | 3 | " | " | " | " | " | " | " | " | " |
| | 4 | " | " | " | " | " | " | " | " | " |
| | 5 | " | " | " | " | " | " | " | " | " |
| | 6 | " | " | " | " | " | " | " | " | " |
| | 7 | " | " | " | " | " | " | " | " | " |
| | 8 | " | " | " | " | " | " | " | " | " |
| | 9 | " | " | " | " | " | " | " | " | " |
| | 10 | " | " | " | " | " | " | " | " | " |
| | 11 | " | " | " | " | " | " | " | " | " |
| | 12 | " | " | " | " | " | " | " | " | " |

| No. | | Black film Additive 3 Material *17 | Additive 3 Proportion (parts) *18 | Additive 4 Material *19 | Additive 4 Proportion (parts) *20 | Additive 5 Material *21 | Additive 5 Proportion (parts) *22 | Additive 6 Material *23 | Additive 6 Proportion (parts) *24 | Baking temp. (°C.) | Thickness (μ) |
|---|---|---|---|---|---|---|---|---|---|---|---|
| Sample of the invention | 1 | 1 | 10 | 1 | 20 | 1 | 10 | — | — | 210 | 1.5 |
| | 2 | " | " | " | " | " | " | 1 | 10 | " | " |
| | 3 | " | " | " | " | " | 1 | " | " | " | " |
| | 4 | " | " | " | " | " | 5 | " | " | " | " |
| | 5 | " | " | " | " | " | 30 | " | " | " | " |
| | 6 | " | " | " | " | " | 40 | " | " | " | " |
| | 7 | " | " | " | " | " | 10 | " | 1 | " | " |
| | 8 | " | " | " | " | " | " | " | 5 | " | " |
| | 9 | " | " | " | " | " | " | " | 30 | " | " |
| | 10 | " | " | " | " | " | " | " | 40 | " | " |
| | 11 | " | " | " | " | 2 | " | " | " | " | " |
| | 12 | " | " | " | " | " | " | 2 | " | " | " |

TABLE 35

<EXAMPLE 6>

TABLE 35-continued

| | | Starting sheet | | Chromate film | | | Black film | | | |
|---|---|---|---|---|---|---|---|---|---|---|
| | | | | | | | | | Additive 1 | | Additive 2 | |
| No. | | Material *11 | Coating weight (g/m²) | Material | Coating weight of chromium (mg/m²) | Base Resin *12 | Material *13 | Proportion (parts) *14 | Material *15 | Proportion (parts) *16 |
| Comparative sample | 1 | 1 | 20 | coating | 50 | 1 | 1 | 80 | 2 | 100 |
| | 2 | " | " | " | " | " | " | " | " | " |

| | | Black film | | | | | | | | |
|---|---|---|---|---|---|---|---|---|---|---|
| | | Additive 3 | | Additive 4 | | Additive 5 | | Additive 6 | | | |
| No. | | Material *17 | Proportion (parts) *18 | Material *19 | Proportion (parts) *20 | Material *21 | Proportion (parts) *22 | Material *23 | Proportion (parts) *24 | Baking temp. (°C.) | Thickness (μ) |
| Comparative sample | 1 | — | — | — | — | 1 | 70 | — | — | 210 | 1.5 |
| | 2 | — | — | — | — | — | — | 1 | 70 | " | " |

TABLE 36

<EXAMPLE 6>

| No. | | Blackness (L value) | Specular gloss | Resistance to staining by fingerprints | Weldability | Formability | Adhesion | Corrosion resistance Flat portion | Corrosion resistance Formed portion | Light fastness |
|---|---|---|---|---|---|---|---|---|---|---|
| Sample of the invention | 1 | ○ (23) | 0.6 | ⊙ | ⊙ | ⊙ | ⊙ | ⊙ | ⊙ | ⊙ |
| | 2 | ○ (24) | 0.5 | ⊙ | ⊙ | ⊙ | ⊙ | ⊙ | ⊙ | ⊙ |
| | 3 | ○ (23) | 0.6 | ⊙ | ⊙ | ○+ | ⊙ | ⊙ | ⊙ | ⊙ |
| | 4 | ○ (23) | 0.6 | ⊙ | ⊙ | ⊙ | ⊙ | ⊙ | ⊙ | ⊙ |
| | 5 | ○— (27) | 0.5 | ⊙ | ⊙ | ⊙ | ⊙ | ⊙ | ⊙ | ⊙ |
| | 6 | ○ (28) | 0.5 | ⊙ | ⊙ | ⊙ | ⊙ | ⊙ | ⊙ | ⊙ |
| | 7 | ○ (23) | 0.6 | ⊙ | ⊙ | ⊙ | ⊙ | ⊙ | ⊙ | ⊙ |
| | 8 | ○ (23) | 0.6 | ⊙ | ⊙ | ⊙ | ⊙ | ⊙ | ⊙ | ⊙ |
| | 9 | ○— (26) | 0.5 | ⊙ | ⊙ | ⊙ | ⊙ | ⊙ | ⊙ | ⊙ |
| | 10 | ○— (28) | 0.5 | ⊙ | ⊙ | ⊙ | ⊙ | ⊙ | ⊙ | ⊙ |
| | 11 | ○ (22) | 0.5 | ⊙ | ⊙ | ⊙ | ⊙ | ⊙ | ⊙ | ⊙ |
| | 12 | ○ (22) | 0.5 | ⊙ | ⊙ | ⊙ | ⊙ | ⊙ | ⊙ | ⊙ |

TABLE 37

<EXAMPLE 6>

| No. | | Blackness (L value) | Specular gloss | Resistance to staining by fingerprints | Weldability | Formability | Adhesion | Corrosion resistance Flat portion | Corrosion resistance Formed portion | Light fastness |
|---|---|---|---|---|---|---|---|---|---|---|
| Comparative sample | 1 | The sedimentation of additive 5 in the paint disabled its application. | | | | | | | | |
| | 2 | The sedimentation of additive 6 in the paint disabled its application. | | | | | | | | |

TABLE 38

<EXAMPLE 7>

| | | Starting sheet | | Chromate film | | | Black film | | | |
|---|---|---|---|---|---|---|---|---|---|---|
| | | | | | | | | | Additive 1 | | Additive 2 | |
| No. | | Material *11 | Coating weight (g/m²) | Material | Coating weight of chromium (mg/m²) | Base Resin *12 | Material *13 | Proportion (parts) *14 | Material *15 | Proportion (parts) *16 |
| Sample of the invention | 1 | 1 | 20 | coating | 50 | 2 | 1 | 80 | 2 | 100 |
| | 2 | " | " | " | " | 3 | 2 | " | " | " |
| | 3 | " | " | Electrolysis coating | 30 | 1 | 1 | " | " | " |
| | 4 | 2 | 30 | coating | 50 | " | " | " | " | " |
| | 5 | 3 | " | " | " | " | " | " | " | " |
| | 6 | 4 | 90 | " | " | " | " | " | " | " |
| | 7 | 5 | 30 | " | " | " | " | " | " | " |
| | 8 | 1 | " | " | " | " | " | " | " | " |
| | 9 | " | " | " | " | " | " | " | " | " |
| | 10 | " | " | " | " | " | " | " | " | " |
| | 11 | " | " | " | " | " | " | " | " | " |
| | 12 | " | 200 | " | " | " | " | " | " | " |
| | 13 | " | 80 | " | " | " | " | " | " | " |

TABLE 38-continued

| No. | | | | | | | | | | |
|---|---|---|---|---|---|---|---|---|---|---|
| 14 | " | 10 | " | " | " | " | " | " | " | " |
| 15 | " | 1 | " | " | " | " | " | " | " | " |

| | | Black film | | | | | | | | |
|---|---|---|---|---|---|---|---|---|---|---|
| | | Additive 3 | | Additive 4 | | Additive 5 | | Additive 6 | | |
| No. | | Material *17 | Proportion (parts) *18 | Material *19 | Proportion (parts) *20 | Material *21 | Proportion (parts) *22 | Material *23 | Proportion (parts) *24 | Baking temp. (°C.) | Thickness ($\mu$) |

| No. | | Material *17 | Proportion *18 | Material *19 | Proportion *20 | Material *21 | Proportion *22 | Material *23 | Proportion *24 | Baking temp. (°C.) | Thickness ($\mu$) |
|---|---|---|---|---|---|---|---|---|---|---|---|
| Sample of the invention | 1 | 1 | 10 | 1 | 20 | 1 | 10 | 1 | 10 | 210 | 1.5 |
| | 2 | " | " | " | " | " | " | " | " | " | " |
| | 3 | " | " | " | " | " | " | " | " | " | " |
| | 4 | " | " | " | " | " | " | " | " | " | " |
| | 5 | " | " | " | " | " | " | " | " | " | " |
| | 6 | " | " | " | " | " | " | " | " | " | " |
| | 7 | " | " | " | " | " | " | " | " | " | " |
| | 8 | " | " | " | " | " | " | " | " | 80 | " |
| | 9 | " | " | " | " | " | " | " | " | 140 | " |
| | 10 | " | " | " | " | " | " | " | " | 250 | " |
| | 11 | " | " | " | " | " | " | " | " | 300 | " |
| | 12 | " | " | " | " | " | " | " | " | 210 | " |
| | 13 | " | " | " | " | " | " | " | " | " | " |
| | 14 | " | " | " | " | " | " | " | " | " | " |
| | 15 | " | " | " | " | " | " | " | " | " | " |

TABLE 39

<EXAMPLE 7>

| No. | | Starting sheet | | Chromate film | | Black film | | | | |
|---|---|---|---|---|---|---|---|---|---|---|
| | | Material *11 | Coating weight (g/m²) | Material | Coating weight of chromium (mg/m²) | Base Resin *2 | Additive 1 | | Additive 2 | |
| | | | | | | | Material *13 | Proportion (parts) *14 | Material *15 | Proportion (parts) *16 |
| Comparative sample | 1 | 1 | 20 | coating | 50 | 4 | 1 | 80 | 2 | 100 |
| | 2 | " | " | " | " | " | " | " | " | " |
| | 3 | " | " | " | " | " | " | " | " | " |
| | 4 | " | 1000 | " | " | " | " | " | " | " |

| | | Black film | | | | | | | | |
|---|---|---|---|---|---|---|---|---|---|---|
| | | Additive 3 | | Additive 4 | | Additive 5 | | Additive 6 | | |
| No. | | Material *17 | Proportion (parts) *18 | Material *19 | Proportion (parts) *20 | Material *21 | Proportion (parts) *22 | Material *23 | Proportion (parts) *24 | Baking temp. (°C.) | Thickness ($\mu$) |
| Comparative sample | 1 | 1 | 10 | 1 | 20 | 1 | 10 | 1 | 10 | 210 | 1.5 |
| | 2 | " | " | " | " | " | " | " | " | 40 | " |
| | 3 | " | " | " | " | " | " | " | " | 350 | " |
| | 4 | " | " | " | " | " | " | " | " | 210 | " |

TABLE 40

<EXAMPLE 7>

| No. | | Blackness (L value) | Specular gloss | Resistance to staining by fingerprints | Weldability | Formability | Adhesion | Corrosion resistance Flat portion | Corrosion resistance Formed portion | Light fastness |
|---|---|---|---|---|---|---|---|---|---|---|
| Sample of the invention | 1 | ○ (24) | 0.5 | ⊙ | ⊙ | ⊙ | ⊙ | ⊙ | ⊙ | ⊙ |
| | 2 | ○ (24) | 0.5 | ⊙ | ⊙ | ⊙ | ⊙ | ⊙ | ⊙ | ⊙ |
| | 3 | ○ (24) | 0.5 | ⊙ | ⊙ | ⊙ | ⊙ | ⊙ | ⊙ | ⊙ |
| | 4 | ○ (24) | 0.5 | ⊙ | ⊙ | ⊙ | ⊙ | ⊙ | ⊙ | ⊙ |
| | 5 | ○ (24) | 0.5 | ⊙ | ⊙ | ⊙ | ⊙ | ⊙ | ⊙ | ⊙ |
| | 6 | ○ (24) | 0.5 | ⊙ | ⊙ | ⊙ | ⊙ | ⊙ | ⊙ | ⊙ |
| | 7 | ○ (24) | 0.5 | ⊙ | ⊙ | ⊙ | ⊙ | ⊙ | ⊙ | ⊙ |
| | 8 | ○ (24) | 0.5 | ⊙ | ⊙ | ⊙ | ⊙ | ⊙ | ⊙ | ⊙ |
| | 9 | ○ (24) | 0.5 | ⊙ | ⊙ | ⊙ | ⊙ | ⊙ | ⊙ | ⊙ |
| | 10 | ○ (24) | 0.5 | ⊙ | ⊙ | ⊙ | ⊙ | ⊙ | ⊙ | ⊙ |
| | 11 | ○ (24) | 0.5 | ⊙ | ⊙ | ⊙ | ⊙ | ⊙ | ⊙ | ⊙ |
| | 12 | ○ (24) | 0.5 | ⊙ | ⊙ | ⊙ | ⊙ | ⊙ | ⊙ | ⊙ |
| | 13 | ○ (24) | 0.5 | ⊙ | ⊙ | ⊙ | ⊙ | ⊙ | ⊙ | ⊙ |
| | 14 | ○ (24) | 0.5 | ⊙ | ⊙ | ⊙ | ⊙ | ⊙ | ⊙ | ⊙ |
| | 15 | ○ (24) | 0.5 | ⊙ | ⊙ | ⊙ | ⊙ | ⊙ | ⊙ | ⊙ |

TABLE 41

<EXAMPLE 7>

| No. | | Blackness (L value) | Specular gloss | Resistance to staining by finger-prints | Weld-ability | Form-ability | Adhesion | Corrosion resistance Flat portion | Corrosion resistance Formed portion | Light fast-ness | Remarks |
|---|---|---|---|---|---|---|---|---|---|---|---|
| Comparative sample | 1 | ○ (24) | 0.6 | ⊙ | ⊙ | — | X | — | — | — | Liable to damage |
| | 2 | ○ (22) | 1.0 | ⊙ | ⊙ | — | X | — | — | — | |
| | 3 | ○ (24) | 0.6 | ⊙ | ⊙ | — | — | X | X | — | |
| | 4 | ○ (24) | 0.5 | ⊙ | X | — | — | — | — | — | |

TABLE 42

<EXAMPLE 1>

| No. | | Starting sheet Material *1 | Starting sheet Coating weight (g/m²) | Chromate film Material | Chromate film Coating weight of chromium (mg/m²) | Black film Base Resin *2 | Black film Additive 1 Material *3 | Black film Additive 1 Proportion (parts) *4 |
|---|---|---|---|---|---|---|---|---|
| Sample of the invention | 1 | 1 | 20 | coating | 50 | 1 | 1 | 80 |
| | 2 | " | " | " | " | " | " | " |
| | 3 | " | " | " | " | " | " | " |
| | 4 | " | " | " | " | " | " | " |
| | 5 | " | " | " | " | " | " | " |
| | 6 | " | " | Electrolysis | 30 | " | " | " |
| | 7 | " | " | Reaction | " | " | " | " |
| | 8 | " | " | coating | 50 | " | " | " |
| | 9 | " | " | " | " | " | " | " |
| | 10 | " | " | " | " | " | " | " |

| No. | | Black film Additive 2 Material *5 | Additive 2 Proportion (parts) *6 | Additive 3 Material *7 | Additive 3 Proportion (parts) *8 | Additive 4 Material *9 | Additive 4 Proportion (parts) *10 | Baking temp. (°C.) | Thickness (μ) | Weld-ability |
|---|---|---|---|---|---|---|---|---|---|---|
| Sample of the invention | 1 | 1 | 60 | — | — | — | — | 210 | 0.3 | ⊙ |
| | 2 | " | " | — | — | — | — | " | 0.8 | ⊙ |
| | 3 | " | " | — | — | — | — | " | 1.5 | ⊙ |
| | 4 | " | " | — | — | — | — | " | 3.0 | ⊙ |
| | 5 | " | " | — | — | — | — | " | 5.0 | ○ |
| | 6 | " | " | — | — | — | — | " | 1.5 | ⊙ |
| | 7 | " | " | — | — | — | — | " | " | ⊙ |
| | 8 | 4 | " | 1 | 10 | — | — | " | " | ⊙ |
| | 9 | " | " | — | — | 1 | 10 | " | " | ⊙ |
| | 10 | " | " | 1 | 10 | " | " | " | " | ⊙ |

TABLE 43

<EXAMPLE 1>

| No. | | Starting sheet Material *11 | Starting sheet Coating weight (g/m²) | Chromate film Material | Chromate film Coating weight of chromium (mg/m²) | Black film Base Resin *12 | Black film Additive 1 Material *13 | Black film Additive 1 Proportion (parts) *14 | Black film Additive 2 Material *15 | Black film Additive 2 Proportion (parts) *16 |
|---|---|---|---|---|---|---|---|---|---|---|
| Sample of the invention | 1 | 1 | 20 | coating | 50 | 1 | 1 | 80 | 2 | 40 |
| | 2 | " | " | " | " | " | " | " | " | " |
| | 3 | " | " | " | " | " | " | " | " | 50 |
| | 4 | " | " | " | " | " | " | " | " | " |
| | 5 | " | " | " | " | " | " | " | " | " |
| | 6 | " | " | Electrolysis | 30 | " | " | " | " | " |
| | 7 | " | " | Reation | " | " | " | " | " | " |
| | 8 | " | " | coating | 50 | " | " | " | " | 100 |
| | 9 | " | " | " | " | " | " | " | " | " |
| | 10 | " | " | " | " | " | " | " | " | " |
| | 11 | " | " | " | " | " | " | " | " | " |
| | 12 | " | " | " | " | " | " | " | " | " |

| No. | Black film Additive 3 Material *17 | Additive 3 Proportion (parts) *18 | Additive 4 Material *19 | Additive 4 Proportion (parts) *20 | Additive 5 Material *21 | Additive 5 Proportion (parts) *22 | Additive 6 Material *23 | Additive 6 Proportion (parts) *24 | Baking temp. (°C.) | Thickness (μ) | Weld-ability |
|---|---|---|---|---|---|---|---|---|---|---|---|

TABLE 43-continued

| | | | | | | | | | | | | |
|---|---|---|---|---|---|---|---|---|---|---|---|---|
| Sample of the invention | 1 | — | — | — | — | — | — | — | — | 210 | 0.3 | ⊚ |
| | 2 | — | — | — | — | — | — | — | — | " | 0.8 | ⊚ |
| | 3 | — | — | — | — | — | — | — | — | " | 1.5 | ⊚ |
| | 4 | — | — | — | — | — | — | — | — | " | 3.0 | ⊚ |
| | 5 | — | — | — | — | — | — | — | — | " | 5.0 | ○ |
| | 6 | — | — | — | — | — | — | — | — | " | 1.5 | ⊚ |
| | 7 | — | — | — | — | — | — | — | — | " | " | ⊚ |
| | 8 | 1 | 10 | — | — | — | — | — | — | " | " | ⊚ |
| | 9 | — | — | 1 | 20 | — | — | — | — | " | " | ⊚ |
| | 10 | 1 | 10 | " | " | — | — | — | — | " | " | ⊚ |
| | 11 | " | " | " | " | 1 | 10 | — | — | " | " | ⊚ |
| | 12 | " | " | " | " | " | " | 1 | 10 | " | " | ⊚ |

TABLE 44

<EXAMPLE 2>

| | Starting sheet | | Composition of chromating solution | | | | | Coating weight of chromium (mg/m$^2$) | Drying temp. (°C.) |
|---|---|---|---|---|---|---|---|---|---|
| No. | Material*1 | Coating weight (g/m$^2$) | $\frac{Cr^{6+}}{Cr^{3+}}$ | $\frac{SiO_2}{Total\ Cr}$ | $\frac{Aqueous\ resin^{*2}}{Total\ Cr}$ | $\frac{PO_4^{3-}}{Total\ Cr}$ | $\frac{Zn^{2+}}{Cr^{6+}}$ | | |
| Sample of the invention | | | | | | | | | |
| 1 | 1 | 20 | 80/20 | 4/1 | — | — | — | 50 | 210 |
| 2 | " | " | 50/50 | " | — | — | — | " | " |
| 3 | " | " | 40/60 | " | — | — | — | " | " |
| 4 | " | " | 70/30 | 1/2 | — | — | — | " | " |
| 5 | " | " | " | 1/1 | — | — | — | " | " |
| 6 | " | " | " | 7/1 | — | — | — | " | " |
| 7 | " | " | " | 8/1 | — | — | — | " | " |
| 8 | " | " | " | — | 1/20 | — | — | " | " |
| 9 | " | " | " | — | 10/1 | — | — | " | " |
| 10 | " | " | " | 3/1 | 40/1 | — | — | " | " |

*1See TABLE 1
*2Polyester resin.

TABLE 45

<EXAMPLE 2>

| | Starting sheet | | Composition of chromating solution | | | | | Coating weight of chromium (mg/m$^2$) | Drying temp. (°C.) |
|---|---|---|---|---|---|---|---|---|---|
| No. | Material*1 | Coating weight (g/m$^2$) | $\frac{Cr^{6+}}{Cr^{3+}}$ | $\frac{SiO_2}{Total\ Cr}$ | $\frac{Aqueous\ resin^{*2}}{Total\ Cr}$ | $\frac{PO_4^{3-}}{Total\ Cr}$ | $\frac{Zn^{2+}}{Cr^{6+}}$ | | |
| Sample of the invention | | | | | | | | | |
| 11 | 1 | 20 | 70/30 | 4/1 | 10/1 | 1/30 | 1/10 | 50 | 210 |
| 12 | " | " | " | " | " | 2/1 | 1/10 | " | " |
| 13 | " | " | " | " | " | 1/10 | 1/40 | " | 70 |
| 14 | " | " | " | " | " | — | — | " | 300 |
| 15 | " | " | " | " | " | — | — | 10 | 210 |
| 16 | " | " | " | " | " | — | — | 120 | " |
| Comparative sample | | | | | | | | | |
| 1 | " | " | 90/10 | — | — | — | — | 50 | 100 |
| 2 | " | " | 30/70 | — | — | — | — | " | " |
| 3 | " | " | 70/30 | — | — | — | — | 200 | " |
| 4 | " | " | " | — | — | — | — | 50 | 350 |

*1See TABLE 1
*2Polyester resin.

TABLE 46

<EXAMPLE 2>

Properties of chromate film on which no black film was formed

| No. | Corrosion resistance | Fixed chromium (%) | Resistance to Staining by Fingerprints | Properties of sheet Weldability |
|---|---|---|---|---|
| Sample of the invention | | | | |
| 1 | ○+ | Δ | ○ | ⊚ |
| 2 | ○ | ○+ | ○ | ⊚ |
| 3 | Δ | ○+ | ○ | ⊚ |

TABLE 46-continued

<EXAMPLE 2>
Properties of chromate film on which no black film was formed

| No. | Corrosion resistance | Fixed chromium (%) | Resistance to Staining by Fingerprints | Properties of sheet Weldability |
|---|---|---|---|---|
| 4 | ○ | ○ | ○ | ⊚ |
| 5 | ○+ | ○ | ○ | ⊚ |
| 6 | ○+ | ○ | ○ | ⊚ |
| 7 | ○+ | ○ | ○ | ⊚ |
| 8 | ○+ | ○ | ○ | ⊚ |
| 9 | ○+ | ○ | ○ | ⊚ |

TABLE 47

<EXAMPLE 2>
Properties of chromate film on which no black film was formed

| No. | Corrosion resistance | Fixed chromium (%) | Resistance to Staining by Fingerprints | Properties of sheet Weldability |
|---|---|---|---|---|
| Sample of the invention | | | | |
| 11 | ○+ | ○+ | ○ | ⊚ |
| 12 | ○+ | ○+ | ○ | ⊚ |
| 13 | ○+ | Δ | ○ | ⊚ |
| 14 | ○+ | ○+ | ○ | ⊚ |
| 15 | Δ | ○ | ○ | ⊚ |
| 16 | ○+ | Δ | ○ | ⊚ |
| Comparative sample | | | | |
| 1 | ○ | X | Δ | ⊚ |
| 2 | X | ○ | Δ | ⊚ |
| 3 | ○ | X | Δ | ⊚ |
| 4 | X | ○+ | Δ | ⊚ |

What is claimed is:

1. A weldable black steel sheet with low gloss appearance comprising a steel sheet plated with zinc or a zinc alloy, and carrying a chromate film formed on a surface of said plated sheet and having a coating weight of 1 to 200 mg/m$^2$ in terms of metallic chromium, and a black film formed on at least said chromate film on one side of said sheet from a composition comprising 100 parts by weight of a thermosetting base resin, 1 to 200 parts by weight of a black dye and 1 to 150 parts by weight of organic resin particles, said base resin and said dye being soluble in an organic solvent, said black film having a thickness of 0.3 to 5.0 microns.

2. A weldable black steel sheet with low gloss appearance comprising a steel sheet plated with zinc or a zinc alloy, and carrying a chromate film formed on a surface of said plated sheet and having a coating weight of 1 to 200 mg/m$^2$ in terms of metallic chromium, and a black film formed on at least said chromate film on one side of said sheet from a composition comprising 100 parts by weight of a thermosetting base resin, 1 to 200 parts by weight of a black dye, 1 to 150parts by weight of organic resin particles and 1 to 100parts by weight of fine inorganic particles, said base resin and said dye being soluble in an organic solvent, said black film having a thickness of 0.3 to 5.0 microns.

3. A weldable black steel sheet with low gloss appearance comprising a steel sheet plated with zinc or a zinc alloy, and carrying a chromate film formed on a surface of said plated sheet and having a coating weight of 1 to 200 mg/m$^2$ in terms of metallic chromium, and a black film formed on at least said chromate film on one side of said sheet from a composition comprising 100 parts by weight of a thermosetting base resin, 1 to 200 parts by weight of a black dye, 1 to 150 parts by weight of organic resin particles and 1 to 100 parts by weight of a solid lubricant, said base resin and said dye being soluble in an organic solvent, said black film having a thickness of 0.3 to 5.0 microns.

4. A weldable black steel sheet with low gloss appearance comprising a steel sheet plated with zinc or a zinc alloy, and carrying a chromate film formed on a surface of said plated sheet and having a coating weight of 1 to 200 mg/m$^2$ in terms of metallic chromium, and a black film formed on at least said chromate film on one side of said sheet from a composition comprising 100 parts by weight of a thermosetting base resin, 1 to 200 parts by weight of a black dye, 1 to 150 parts by weight of organic resin particles, 1 to 100 parts by weight of fine inorganic particles and i to 1 00 parts by weight of a solid lubricant, said base resin and said dye being soluble in an organic solvent, said black film having a thickness of 0.3 to 5.0 microns.

5. A weldable black steel sheet of low gloss as set forth in claim 2 or 4, wherein said fine inorganic particles are of at least one material selected from the group consisting of silica, an extender pigment, a sparingly soluble chromic acid salt and carbon black.

6. A weldable black steel sheet of low gloss as set forth in claim 3 or 4, wherein said solid lubricant is at least one material selected from the group consisting of polyolefin wax, paraffin wax, fluororesin compounds, fatty acid amides, metallic soaps, molybdenum disulfide, graphite, graphite fluoride, boron nitride and polyalkylene glycols.

7. A weldable black steel sheet of low gloss as set forth in any one of claims 1 to 4, wherein said organic resin particles are of at least one resin selected from the group consisting of urethane, silicone, epoxy, amino, acrylic, acrylonitrile, acryl-urethane, polyamide, polyester and polypropylene resins.

8. A weldable black steel sheet of low gloss as set forth in any one of claims 1 to 4, wherein said organic resin particles are black particles of at least one resin selected from the group consisting of urethane, silicone, epoxy, amino, acrylic, acrylonitrile, acryl-urethane, polyamide, polyester and polypropylene resins.

9. A weldable black steel sheet of low gloss as set forth in any one of claims 1 to 4, wherein said black dye is at least one dye selected from the group consisting of azo and azine dyes.

10. A weldable black steel sheet of low gloss as set forth in any one of claims 1 to 4, wherein said black dye is an metal complex of azo dye.

11. A weldable black steel sheet of low gloss as set forth in any one of claims 1 to 4, wherein said black dye is a mixture of a phthalocVanine dye and a metal complex of azo dye.

12. A weldable black steel sheet with low gloss appearance comprising a steel sheet plated with zinc or a zinc alloy, and carrying a chromate film formed on a surface of said plated sheet and having a coating weight of 1 to 200 mg/m$^2$ in terms of metallic chromium, and a black film formed on at least said chromate film on one side of said sheet from a composition comprising 100 parts by weight of a thermosetting base resin, 1 to 200 parts by weight of a black dye and 10 to 150 parts by weight of organic resin particles having an average diameter of 2 to 25 microns, said base resin and said dye being soluble in an organic solvent, said black film having a thickness of 0.3 to 5.0 microns.

13. A weldable black steel sheet with low gloss appearance comprising a steel sheet plated with zinc or a zinc alloy, and carrying a chromate film formed on a surface of said plated sheet and having a coating weight of 1 to 200 mg/m$^2$ in terms of metallic chromium, and a black film formed on at least said chromate film on one side of said sheet from a composition comprising 100 parts by weight of a thermosetting base resin, 1 to 200 parts by weight of a black dye, 10 to 150 parts by weight of organic resin particles having an average diameter of 2 to 25 microns and 1 to 30 parts by weight of silica such as a precipitated type or a gel type, obtained by the reaction of sodium silicate and mineral acids, said base resin and said dye being soluble in an organic solvent, said black film having a thickness of 0.3 to 5.0 microns.

14. A weldable black steel sheet with low gloss appearance comprising a steel sheet plated with zinc or a zinc alloy, and carrying a chromate film formed on a surface of said plated sheet and having a coating weight of 1 to 200 mg/m$^2$ in terms of metallic chromium, and a black film formed on at least said chromate film on one side of said sheet from a composition comprising 100 parts by weight of a thermosetting base resin, 1 to 200 parts by weight of a black dye, 10 to 150 parts by weight of organic resin particles having an average diameter of 2 to 25 microns and 1 to 40 parts by weight of particles of a fluorine compound, said base resin and said dye being soluble in an organic solvent, said black film having a thickness of 0.3 to 5.0 microns.

15. A weldable black steel sheet with low gloss appearance comprising a steel sheet plated with zinc or a zinc alloy, and carrying a chromate film formed on a surface of said plated sheet and having a coating weight of 1 to 200 mg/m$^2$ in terms of metallic chromium, and a black film formed on at least said chromate film on one side of said sheet from a composition comprising 100 parts by weight of a thermosetting base resin, 1 to 200 parts by weight of a black dye, 10 to 150 parts by weight of organic resin particles having an average diameter of 2 to 25 microns, 1 to 30 parts by weight of silica such as a precipitated type or gel type, obtained by the reaction of sodium silicate and mineral acids, and 1 to 40 parts by weight of particles of a fluorine compound, said base resin and said dye being soluble in an organic solvent, said black film having a thickness of 0.3 to 5.0 microns.

16. A weldable black steel sheet of low gloss as set forth in any of claims 12 to 15, wherein said composition further contains a total of 1 to 40 parts by weight of at least one of a sparingly soluble chromic acid salt and fumed silica, wherein said sparingly soluble chromic acid salt is at least one material selected from the group consisting of barium chromate, strontium chromate, calcium chromate, zinc chromate, potassium zinc chromate, lead chromate and silver chromate.

17. A weldable black steel sheet of low gloss as set forth in any one of claims 12 to 15, wherein said composition further contains a total of 1 to 40 parts by weight of at least one of polyethylene and paraffin waxes.

18. A weldable black steel sheet of low gloss as set forth in any one of claims 12 to 15, wherein said composition further contains a total of 1 to 40 parts by weight of at least one of a sparingly soluble chromic acid salt and fumed silica, wherein said sparingly soluble chromic acid salt is at least one material selected from the group consisting of barium chromate, strontium chromate, calcium chromate, zinc chromate, potassium zinc chromate, lead chromate and silver chromate, and a total of 1 to 40 parts by weight of at least one of polyethylene and paraffin waxes.

19. A weldable black steel sheet of low gloss as set forth in any of claims 12 to 15, wherein said organic resin particles are of at least one resin selected from the group consisting of urethane, silicone, epoxy, amino, acrylic, acrylonitrile, acryl-urethane, polyamide, polyester and polypropylene resins.

20. A weldable black steel sheet of low gloss as set forth in any one of claims 12 to 15, wherein said organic resin particles are black particles of at least one resin selected from the group consisting of urethane, silicone, epoxy, amino, acrylic, acrylonitrile, acryl-urethane, polyamide, polyester and polypropylene resins.

21. A weldable black steel sheet of low gloss as set forth in any one of claims 12 to 15, wherein said black dye is at least one dye selected from the group consisting of azo and azine dyes.

22. A weldable black steel sheet of low gloss as set forth in any one of claims 12 to 15, wherein said black dye is an metal complex of azo dye.

23. A weldable black steel sheet of low gloss as set forth in any of claims 12 to 15, wherein said black dye is a mixture of a phthalocyanine dye and a metal complex of azo dye.

24. A weldable black steel sheet as set forth in any one of claims 1 to 4 and 12 to 15, wherein said black film exists only on said one side of said sheet and said chromate film on the other side of said sheet has a coating weight of 10 to 120 mg/m$^2$ in terms of metallic chromium.

25. A weldable black steel sheet as set forth in claim 24, wherein said chromate film on said other side of said sheet is a film formed by coating its surface with a chromating solution containing hexavalent and trivalent chromium ions in a weight ratio of 40/60 (hexavalent/trivalent) to 80/20 in terms of metallic chromium, and drying it under heat.

26. A weldable black steel sheet as set forth in claim 24, wherein said chromate film on said other side of said sheet is a film formed by coating its surface with a chromating solution containing hexavalent and trivalent chromium ions, and a colloidal silica in such proportions that said hexavalent and trivalent chromium ions may have a weight ratio of 40/60 (hexavalent/trivalent) to 80/20 in terms of metallic chromium, while said silica sol and said chromium ions in terms of metallic chromium have a weight ratio of $\frac{1}{2}$ (colloidal silica/chromium ions) to 8/1, and drying it under heat.

27. A weldable black steel sheet as set forth in claim 24, wherein said chromate film on said other side of said sheet is a film formed by coating its surface with a chromating solution containing hexavalent and trivalent chromium ions, and an aqueous resin in such proportions that said hexavalent and trivalent chromium ions may have a weight ratio of 40/60 (hexavalent/trivalent) to 80/20 in terms of metallic chromium, while said aqueous resin and said chromium ions in terms of metallic chromium have a weight ratio of 1/20 (aqueous resin/chromium ions) to 40/1, and drying it under heat.

28. A weldable black steel sheet as set forth in claim 24, wherein said chromate film on said other side of said sheet is a film formed by coating its surface with a chromating solution containing hexavalent and trivalent chromium ions, a colloidal silica and an aqueous resin in such proportions that said hexavalent and trivalent chromium ions may have a weight ratio of 40/60 (hexavalent/trivalent) to 80/20 in terms of metallic chromium, while said colloidal silica and said chromium ions in terms of metallic chromium have a weight ratio of $\frac{1}{2}$ (colloidal silica/chromium ions) to 8/1, and said aqueous resin and said chromium ions in terms of metallic chromium have a weight ratio of 1/20 (aqueous resin/chromium ions) to 40/1, and drying it under heat.

29. A weldable black steel sheet as set forth in claim 24, wherein said chromate film on said other side of said sheet is a film formed by coating its surface with a chromating solution containing hexavalent and trivalent chromium ions, trivalent PO$_4$ ions and divalent zinc ions in such proportions that said hexavalent and trivalent chromium ions may have a weight ratio of 40/60 (hexavalent/trivalent) to 80/20 interims of metallic chromium, while said PO$_4$ ions and said chromium ions in terms of metallic chromium have a weight ratio of 1/30 (PO4/chromium) to 2/1, and said zinc ions and said hexavalent chromium ions in terms of metallic chromium have a weight ratio of 1/40 (zinc/chromium) to $\frac{2}{3}$, and drying it under heat.

30. A weldable black steel sheet as set forth in claim 24, wherein said chromate film on said other side of said sheet is a film formed by coating its surface with a chromating solution containing hexavalent and trivalent chromium ions, a colloidal silica, trivalent PO$_4$ ions and divalent zinc ions in such proportions that said hexavalent and trivalent chromium ions may have a weight ratio of 40/60 (hexavalent/trivalent) to 80/20 in terms of metallic chromium, while said colloidal silica and said chromium ions in terms of metallic chromium have a weight ratio of $\frac{1}{2}$ (colloidal silica/chromium ions) to 8/1, said PO$_4$ ions and said chromium ions in terms of metallic chromium have a weight ratio of 1/30 (PO$_4$/chromium) to 2/1, and said zinc ions and said hexavalent chromium ions in terms of metallic chromium have a weight ratio of 1/40 (zinc/chromium) to $\frac{2}{3}$, and drying it under heat.

31. A weldable black steel sheet as set forth in claim 24, wherein said chromate film on said other side of said sheet is a film formed by coating its surface with a chromating solution containing hexavalent and trivalent chromium ions, an aqueous resin, trivalent PO$_4$ ions and divalent zinc ions in such proportions that said hexavalent and trivalent chromium ions may have a weight ratio of 40/60 (hexavalent/trivalent) to 80/20 in terms of metallic chromium, while said aqueous resin and said chromium ions in terms of metallic chromium have a weight ratio of 1/20 (resin/chromium) to 40/1, said PO$_4$ ions and said chromium ions in terms of metallic chromium have a weight ratio of 1/30 (PO$_4$/chromium) to 2/1, and said zinc ions and said hexavalent chromium ions in terms of metallic chromium have a weight ratio of 1/40 (zinc/chromium) to $\frac{2}{3}$, and drying it under heat.

32. A weldable black steel sheet as set forth in claim 24, wherein said chromate film on said other side of said sheet is a film formed by coating its surface with a chromating solution containing hexavalent and trivalent chromium ions, a colloidal silica, an aqueous resin, trivalent PO$_4$ ions and divalent zinc ions in such proportions that said hexavalent and trivalent chromium ions may have a weight ratio of 40/60 (hexavalent/trivalent) to 80/20 in terms of metallic chromium, while said colloidal silica and said chromium ions in terms of metallic chromium have a weight ratio of $\frac{1}{2}$ (colloidal Silica/chromium) to 8/1, said aqueous resin and said chromium ions in terms of metallic chromium have a weight ratio of 1/20 (resin/chromium) to 40/1, said PO$_4$ ions and said chromium ions in terms of metallic chromium have a weight ratio of 1/30 (PO$_4$/chromium) to 2/1 and said zinc ions and said hexavalent chromium ions in terms of metallic chromium have a weight ratio of 1/40 (zinc/chromium) to $\frac{2}{3}$, and drying it under heat.

* * * * *